US012742081B2

(12) United States Patent
Yamashita et al.

(10) Patent No.: US 12,742,081 B2
(45) Date of Patent: Sep. 22, 2026

(54) AQUEOUS INK, INK CARTRIDGE, INK JET RECORDING METHOD, TITANIUM OXIDE PARTICLE DISPERSION, METHOD FOR PRODUCING TITANIUM OXIDE PARTICLE DISPERSION AND METHOD FOR PRODUCING AQUEOUS INK

(71) Applicant: CANON KABUSHIKI KAISHA, Tokyo (JP)

(72) Inventors: Yoshihisa Yamashita, Osaka (JP); Junichi Sakai, Tokyo (JP); Hideki Yamakami, Kanagawa (JP); Shoichi Takeda, Kanagawa (JP); Mikio Sanada, Kanagawa (JP); Yoshiyuki Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 17/937,718

(22) Filed: Oct. 3, 2022

(65) Prior Publication Data

US 2023/0159772 A1 May 25, 2023

(30) Foreign Application Priority Data

Oct. 6, 2021 (JP) ................................ 2021-165004
Sep. 13, 2022 (JP) ................................ 2022-145602

(51) Int. Cl.
*C09D 11/102* (2014.01)
*B41J 2/01* (2006.01)
(Continued)

(52) U.S. Cl.
CPC ............... *C09D 11/102* (2013.01); *B41J 2/01* (2013.01); *C09D 11/037* (2013.01); *C09D 11/322* (2013.01)

(58) Field of Classification Search
CPC ........ B41J 2/01; C09D 11/102; C09D 11/037; C09D 11/322; C08K 9/02; C08K 9/10;
(Continued)

(56) References Cited

U.S. PATENT DOCUMENTS

2004/0024091 A1 2/2004 Yamada
2011/0281032 A1 11/2011 Kagata
(Continued)

FOREIGN PATENT DOCUMENTS

CN 1681894 A 10/2005
CN 1721483 A 1/2006
(Continued)

OTHER PUBLICATIONS

Gelest, Hydrophobicity, Hydrophilicity, and Silane Surface Modification, 2011. (Year: 2011).*

*Primary Examiner* — Robert S Jones, Jr.
*Assistant Examiner* — Elizabeth Amato
(74) *Attorney, Agent, or Firm* — Canon U.S.A., Inc. IP Division

(57) ABSTRACT

An aqueous ink for ink jet recording contains a titanium oxide particle containing titanium oxide, at least part of the surface of the titanium oxide being covered with alumina and silica in specific proportions, and a compound serving as a dispersant for the titanium oxide particle, the compound being represented by the following general formula (1):

(1)

where in general formula (1), $R_1$, $R_2$ and $R_3$ are each independently a hydrogen atom or an alkyl group having 1

(Continued)

to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

18 Claims, 2 Drawing Sheets

(51) Int. Cl.
*C09D 11/037* (2014.01)
*C09D 11/322* (2014.01)

(58) Field of Classification Search
CPC .... C08K 3/36; C08K 3/18; C08K 2003/2227; C08K 2003/2237; C08K 2003/2241
See application file for complete search history.

(56) References Cited

U.S. PATENT DOCUMENTS

2013/0273259 A1 10/2013 Depardieu
2014/0118449 A1* 5/2014 Sarkisian ............... C09D 11/40 524/436
2018/0311968 A1 11/2018 Sato
2019/0225826 A1 7/2019 Ingle
2019/0231662 A1 8/2019 Lingoes
2019/0352434 A1 11/2019 Yoshida et al.
2024/0360296 A1* 10/2024 Ota ......................... B29C 41/14

FOREIGN PATENT DOCUMENTS

CN 105143365 A 12/2015
CN 107254198 A 10/2017
CN 108136770 A 6/2018
CN 108625188 A 10/2018
CN 110023415 A 7/2019
EP 360 682 A1 8/2018
JP 2009114346 A 5/2009
JP 2009191222 A 8/2009
JP 2011225867 A 11/2011
JP 2012122028 A 6/2012
JP 2016079241 A 5/2016
JP 2020084072 A 6/2020
WO 2018/144181 A1 8/2018
WO 2021/123127 A1 6/2021

* cited by examiner

AQUEOUS INK, INK CARTRIDGE, INK JET RECORDING METHOD, TITANIUM OXIDE PARTICLE DISPERSION, METHOD FOR PRODUCING TITANIUM OXIDE PARTICLE DISPERSION AND METHOD FOR PRODUCING AQUEOUS INK

BACKGROUND OF THE INVENTION

Field of the Invention

The present disclosure relates to an aqueous ink, an ink cartridge, an ink jet recording method, a titanium oxide particle dispersion, a method for producing a titanium oxide particle dispersion and a method for producing an aqueous ink.

Description of the Related Art

In recent years, ink jet recording apparatuses have been widely used for outputting advertisements and exhibits with recording media, such as paper and resin films. For example, in order to express a clear color image even on a transparent recording medium, a white ink is used in combination with a black ink and basic color inks (hereinafter, these may be collectively referred to as a "color ink"). Specifically, a recording method is employed in which a white ink is applied in advance to a portion of a transparent recording medium including a region where an image is to be recorded to perform undercoating treatment, and color inks is applied thereon, or each ink is applied in the reverse order (what is called back printing).

Titanium oxide is widely used as a coloring material for a white ink because it is low in cost and excellent in characteristics, such as whiteness and concealability, required as a white ink. To stably disperse titanium oxide in an aqueous ink, a dispersant is required. The dispersant is present while repeating adsorption on and desorption from titanium oxide. When an environmental change, such as a temperature change, occurs, the dispersant once desorbed is less likely to be adsorbed again on titanium oxide to impair the dispersion stability, in some cases. Even assuming the temperature during the transport of an ink and various locations where an ink jet recording apparatus is placed, a stable dispersion of titanium oxide needs to be maintained in such a manner that the ejection stability of the ink is not affected.

Hitherto, methods for stably dispersing titanium oxide while maintaining ink ejection stability have been studied. For example, PCT Japanese Translation Patent Publication No. 2017-521348 discloses a method for producing a dry titanium dioxide product in which a part of a silane coupling agent is covalently bonded to the surface of a titanium oxide particle by surface-treating the titanium oxide particle with silica, then further surface-treating the titanium oxide particle with the silane coupling agent and drying the resulting titanium oxide particle. International Publication No. 2018/190848 discloses an ink containing titanium oxide surface-treated with alumina, a monovalent metal salt and a fine alumina particle. Japanese Patent Laid-Open No. 2011-225867 discloses an ink containing titanium oxide subjected to surface treatment with alumina and silica and then surface treatment with a silane coupling agent, an anionic group-containing resin, a water-soluble organic solvent and a basic compound.

SUMMARY OF THE INVENTION

The inventors have conducted studies on ejection stability with an aqueous ink prepared using the dry titanium dioxide disclosed in PCT Japanese Translation Patent Publication No. 2017-521348 and with the aqueous inks disclosed in International Publication No. 2018/190848 and Japanese Patent Laid-Open No. 2011-225867. As a result, it has been found that the ejection stability is insufficient and there is room for improvement in the present situation in which good performance is required even in assumed more severe environmental changes.

Accordingly, the present disclosure provides a titanium oxide-containing aqueous ink that is used for ink jet recording and that has superior ejection stability, an ink cartridge containing the aqueous ink and an ink jet recording method. The present disclosure also provides a method for producing a titanium oxide particle dispersion that can be used in the production of an aqueous ink for ink jet recording, the aqueous ink having superior ejection stability, and a method for producing an aqueous ink using the titanium oxide particle dispersion obtained by the production method.

One aspect of the present disclosure is directed to providing an aqueous ink for ink jet recording, the aqueous ink containing a titanium oxide particle and a dispersant for the titanium oxide particle, in which the titanium oxide particle contains titanium oxide, at least part of the surface of the titanium oxide is covered with alumina and silica, the proportion of the alumina in the titanium oxide particle is 0.50 times or more to 1.00 time or less the proportion of the silica in the titanium oxide particle in terms of a mass ratio, and the dispersant for the titanium oxide particle is represented by the following general formula (1):

(1)

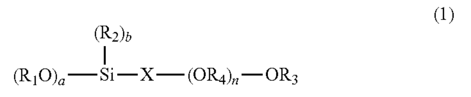

where in general formula (1), $R_1$, $R_2$ and $R_3$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

Further features of the present disclosure will become apparent from the following description of exemplary embodiments with reference to the attached drawings.

DESCRIPTION OF THE EMBODIMENTS

Figure 1:
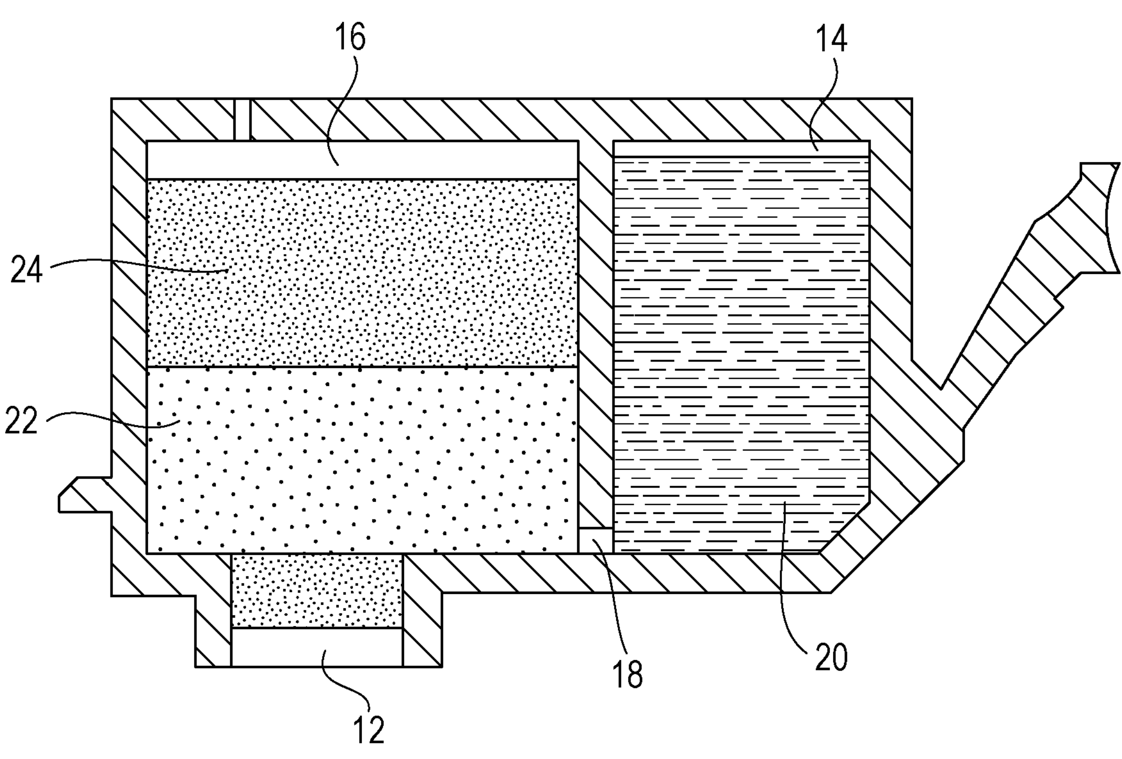
FIG. 1 is a cross-sectional view schematically illustrating an exemplary embodiment of an ink cartridge of the present disclosure.

The present disclosure will be described in more detail below with reference to preferred exemplary embodiments. In an embodiment of the present disclosure, when the compound is a salt, the salt is present in an ink in a state of being dissociated into ions, but it is expressed as "the ink contains the salt" for convenience. Titanium oxide and a titanium oxide particle may be simply referred to as a "pigment". An aqueous ink for ink jet recording may be simply referred to as an "ink". Physical property values are ones at room temperature (25° C.) unless otherwise specified.

An inorganic oxide, such as titanium oxide, reacts with water molecules contained in an aqueous medium in an aqueous ink to form a hydroxy group (hereinafter, referred to as a "surface hydroxy group", in some cases) on the surface of the inorganic oxide. For this reason, in an aqueous ink for ink jet recording, an inorganic oxide is typically used in a state in which the inorganic oxide has been subjected to surface treatment with a different inorganic oxide, such as alumina or silica, in order to further improve the storage stability of the ink while utilizing the formed surface hydroxy group. The surface hydroxy group of a titanium oxide particle has properties unique to the inorganic oxide corresponding to an inorganic compound used for the surface treatment, and the isoelectric point, which is an index of the strength as an acid, differs in accordance with the type of inorganic compound. Accordingly, although titanium oxide itself is an inorganic oxide, the surface of the titanium oxide particle exhibits the properties of the inorganic oxide corresponding to an inorganic compound used for the surface treatment, and the surface charge of the titanium oxide particle strongly depends on the pH of the aqueous medium, the type of surface treating agent and the amount of surface treatment agent used.

The inventors have conducted studies on how to improve the ejection stability of an ink by using a component contained in the ink. To stably disperse titanium oxide, a dispersant is required. Meanwhile, it has been found that the use of a dispersant having a high affinity for titanium oxide makes it possible to stably disperse the titanium oxide, but affects the ejection stability of the ink. Although titanium oxide has a certain degree of dispersion stability due to charge repulsion by a surface hydroxy group, it is difficult to maintain a stable dispersion state for a long period of time. For this reason, typically, the storage stability of the ink is improved by coating titanium oxide with silica and/or alumina, and the dispersion state is stably maintained by using a dispersant suitable for the surface state of a titanium oxide particle.

As a result of studies by the inventors, when titanium oxide was coated only with silica, as described in PCT Japanese Translation Patent Publication No. 2017-521348, sufficient ejection stability of an ink was not able to be obtained even if a dispersant having a low affinity for titanium oxide, such as a silane coupling agent, was used. As described in International Publication No. 2018/190848, when titanium oxide was coated only with alumina, sufficient dispersion stability of a titanium oxide particle was not able to be obtained even if a dispersant having a low affinity for titanium oxide, such as a silane coupling agent, was used. It was also found that when a dispersant having a high affinity for a titanium oxide particle was used in order to increase the dispersion stability of the titanium oxide particle, the ejection stability of an ink was affected, in some cases. Furthermore, it was found that a titanium oxide particle surface-treated with alumina and silica and then surface-treated with a silane coupling agent as described in Japanese Patent Laid-Open No. 2011-225867 exhibited the same tendency as described above.

In such circumstances, the inventors have conducted studies to obtain a good balance between the dispersion stability of a titanium oxide particle and the ejection stability of an ink by adjusting the coating amounts of alumina and silica on the surface of the titanium oxide particle. The inventors also have conducted studies on a dispersant suitable for such a titanium oxide particle. The inventors have found that a titanium oxide particle whose surface is at least partially covered with alumina and silica in specific proportions is dispersed using a specific compound, thereby improving the ejection stability of an ink without deteriorating the dispersion stability of the titanium oxide particle.

That is, an ink and a pigment dispersion according to an embodiment of the present disclosure have the following features. A titanium oxide particle is used in which the proportion of an aluminum element in the titanium oxide particle is 0.57 times or more to 1.13 times or less the proportion of a silicon element in the titanium oxide particle in terms of a mass ratio, the proportions being obtained by inductively coupled plasma-optical emission spectrometry. That is, the titanium oxide particle is used in which the proportion of the alumina in the titanium oxide particle is 0.50 times or more to 1.00 time or less the proportion of the silica in the titanium oxide particle in terms of a mass ratio. As a dispersant for dispersing the titanium oxide particle, a compound represented by the following general formula (1) is used. The mechanism by which the ejection stability of the ink is improved by the above-described configuration is presumed by the present inventors as described below.

An ink or a pigment dispersion contains a compound represented by general formula (1) as a dispersant for dispersing the titanium oxide particle. Some of the compounds represented by general formula (1) are known as silane coupling agents. In general formula (1), each $OR_1$ independently represents a hydroxy group or an alkoxy group having 1 to 4 carbon atoms. A subset of one or more $OR_1$ groups attached to the silicon atom can be partially hydrolyzed in an aqueous medium to form a silanol group, and the silanol group can dissociate into ions. Thus, a "weak affinity" is exhibited by the formation of a hydrogen bond between the surface hydroxy group of the titanium oxide particle and the silanol group of the compound represented by general formula (1). A portion between the surface hydroxy group of the titanium oxide particle and the silanol group of the compound represented by general formula (1) can be in a covalently bonded state due to a dehydration reaction. That is, the surface hydroxy group of the titanium oxide particle and the silanol group in the compound represented by general formula (1) have an affinity for each other due to a hydrogen bond and a covalent bond. The compound represented by general formula (1) can be present in the vicinity of the titanium oxide particle by repeating desorption and adsorption. When $OR_1$ is an alkoxy group having more than 4 carbon atoms, it is difficult to form a silanol group by hydrolysis. Thereby, it is impossible to obtain an affinity for the surface hydroxy group of the titanium oxide particle, to stably disperse the titanium oxide particle or to obtain the ejection stability of the ink.

The compound represented by general formula (1) has, in addition to the moiety capable of forming a silanol group as described above, another moiety, serving as a repeating unit, ($(OR_4)$ n in general formula (1)) including n alkylene oxide groups each having 2 to 4 carbon atoms via X serving as a linking group. Here, n represents the number (average value) of an alkylene oxide group, which is a repeating unit, and is 6 to 24. Hereinafter, the above moiety is also referred to as an "alkylene oxide chain". The alkylene oxide chain is hydrophilic. Thus, the alkylene oxide chain extends moderately in an aqueous medium and exhibits a repulsive force due to steric hindrance. Thus, the presence of the compound represented by general formula (1) in the vicinity of the titanium oxide particle enables the titanium oxide particle to be stably dispersed.

The titanium oxide particle surface-treated with only silica has an affinity for the above-described dispersant, which is also a silicon-containing compound. Thus, the dispersant tends to be excessively present in the vicinity of the titanium oxide particles, and the surface properties of the titanium oxide particles are dominated by the properties of the dispersant. In a state in which an excess amount of the dispersant repeats adsorption and desorption, energy applied when the ink is ejected is consumed to desorb the excess dispersant. For this reason, the ejection speed of the ink is reduced, and the ejection stability of the ink is insufficient.

The titanium oxide particle subjected to the surface treatment with only alumina have a weak affinity for the above-described dispersant, which is a silicon-containing compound, and the dispersant is less likely to be present in the vicinity of the titanium oxide particle. For this reason, although the repulsive force of an electric double layer obtained by ionization of some surface hydroxy groups of the titanium oxide particle is obtained as described above, a stably dispersed state of the titanium oxide particle cannot be maintained in the case of long-term storage or an environmental change such as a change in temperature.

The titanium oxide particle contained in the ink and the pigment dispersion according to an embodiment of the present disclosure is titanium oxide covered with alumina and silica. The proportion of the aluminum element in the titanium oxide particle is 0.57 times or more to 1.13 times or less the proportion of the silicon element in the titanium oxide particle in terms of a mass ratio, the proportions being obtained by inductively coupled plasma-optical emission spectrometry, That is, regarding the proportions of alumina and silica calculated by converting the resulting values of the elements on the basis of their oxides, the proportion of alumina in the titanium oxide particle is 0.50 times or more to 1.00 time or less the proportion of silica in the titanium oxide particle in terms of a mass ratio. When the proportion (% by mass) of the alumina is within the above range, the titanium oxide particle can be stably dispersed, and the ejection stability of the ink is not affected. This is because the amount of dispersant present in the vicinity of the titanium oxide particle can be controlled within a range in which the dispersion stability can be obtained since the titanium oxide particle is covered with alumina in a specific proportion. When the mass ratio is less than 0.50 times, the proportion of silica with respect to alumina is too high. This results in a high affinity for the compound represented by general formula (1), and an excessive amount of the compound is adsorbed on the titanium oxide particle as in the case of the titanium oxide particle covered with only silica. As a result, sufficient ejection stability of the ink cannot be obtained. When the mass ratio is more than 1.00 time, the proportion of silica with respect to alumina is too low. This results in an insufficient affinity for the compound represented by general formula (1), and the titanium oxide particle cannot be stably dispersed. As a result, the ejection stability of the ink cannot be obtained.

In an embodiment of the present disclosure, by a configuration in which the titanium oxide particle containing titanium oxide whose surface is covered with alumina and silica is dispersed using the compound represented by general formula (1), the compound can be widely present around the titanium oxide particle due to the above-described affinity. Thus, the titanium oxide particle can be stably dispersed. Moreover, since the titanium oxide particle is covered with alumina and silica in predetermined proportions, adsorption of the excessive compound can be suppressed. Thus, energy for desorption of the excessive compound used at the time of ejection does not increase, and a decrease in ejection speed can be suppressed. By satisfying these configurations, the ejection stability of the ink can be improved.

Aqueous Ink, Method for Producing Aqueous Ink

The ink according to an embodiment of the present disclosure is an aqueous ink for ink jet recording, the aqueous ink containing a titanium oxide particle covered with a specific inorganic oxide and a specific compound for dispersing the titanium oxide particle. This ink can be a white ink because titanium oxide is a white pigment. The ink according to an embodiment of the present disclosure need not be what is called a "curable ink". Accordingly, the ink according to an embodiment of the present disclosure need not contain a compound, such as a polymerizable monomer that can be polymerized by application of external energy, such as heat or light. The following is a detailed description of the components contained in the ink according to an embodiment of the present disclosure, the physical properties of the ink, a production method and so forth.

Coloring Material

The ink contains, as a coloring material (pigment), a titanium oxide particle containing titanium oxide subjected to surface treatment with a specific inorganic oxide. That is, the ink contains titanium oxide particle containing titanium oxide whose surface is covered with a specific inorganic oxide. The titanium oxide particle content of the ink is preferably 0.10% by mass or more to 20.00% by mass or less based on the total mass of the ink. The titanium oxide particle content of the ink is more preferably 1.00% by mass or more to 20.00% by mass or less based on the total mass of the ink. The titanium oxide particle content of the ink is particularly preferably 1.00% by mass or more to 15.00% by mass or less based on the total mass of the ink.

Titanium oxide is a white pigment and has three crystal forms: rutile, anatase and brookite. Of these, rutile-type titanium oxide can be used. Industrial production methods for titanium dioxide include a sulfuric acid method and a chlorine method. Titanium oxide used in an embodiment of the present disclosure may be produced by any production method.

The 50% cumulative particle size (hereinafter, also referred to as an "average particle size") of the titanium oxide particle on a volume basis is preferably 200 nm or more to 500 nm or less. In particular, the 50% cumulative particle size of the titanium oxide particle on a volume basis is more preferably 200 nm or more to 400 nm or less. The 50% cumulative particle size ($D_{50}$) of the titanium oxide particle on a volume basis is a particle diameter at a cumulative volume of 50% when integrated from the small particle size side based on the total volume of the measured particles in a cumulative particle size curve. The $D_{50}$ of titanium oxide can be measured, for example, under the conditions of SetZero: 30 seconds, number of measurements: 3 times, measurement time: 180 seconds, shape: non-spherical, refractive index: 2.60. As a particle size distribution measurement apparatus, a particle size analyzer based on a dynamic light scattering method can be used. Of course, the measurement conditions and the like are not limited to those described above.

Titanium oxide subjected to surface treatment with alumina and silica is used. Surface treatment should suppress photocatalytic activity and improve dispersibility. In this specification, "alumina" is a generic term for oxides of aluminum, such as aluminum oxide. In this specification, “silica” is a generic term for silicon dioxide and substances composed of silicon dioxide. Most of the alumina and silica covering the titanium oxide are present in the form of aluminum oxide and silicon dioxide.

The proportion of titanium oxide in the titanium oxide particle can be 90.00% by mass or more based on the total mass of the titanium oxide particle. The proportion of titanium oxide in the titanium oxide particle can be 98.50% by mass or less based on the total mass of the titanium oxide particle. The proportion of alumina in the titanium oxide particle needs to be 0.50 times or more to 1.00 time or less the proportion of silica in the titanium oxide particle in terms of a mass ratio. A mass ratio of less than 0.50 times or more than 1.00 time does not result in sufficient ejection stability of the ink. The proportion of silica in the titanium oxide particle can be 1.00% by mass or more to 4.00% by mass or less based on the total mass of the titanium oxide particle. When the proportion of the silica is less than 1.00% by mass, a sufficient affinity for the compound represented by general formula (1) may fail to be obtained, and sufficient ejection stability of the ink may fail to be obtained. When the proportion of the silica is more than 4.00% by mass, the amount of compound represented by general formula (1) adsorbed on the titanium oxide particle may fail to be suppressed even if the surface treatment is performed with alumina, and sufficient ejection stability of the ink may fail to be obtained. The proportion of alumina in the titanium oxide particle can be 0.50% by mass or more to 4.00% by mass or less based on the total mass of the titanium oxide particle.

As a method of measuring the proportions of alumina and silica in the titanium oxide particle, that is, the coating amounts of alumina and silica, for example, quantitative analysis of aluminum and silicon elements by inductively coupled plasma (ICP) optical emission spectrometry can be performed. In this case, calculation can be performed by assuming that all atoms covering the surface are in the form of oxides and converting the obtained aluminum and silicon values into their oxides, i.e., alumina and silica. The proportion of the aluminum element in the titanium oxide particle is 0.57 times or more to 1.13 times or less the proportion of the silicon element in the titanium oxide particle in terms of a mass ratio, the proportions being obtained by inductively coupled plasma-optical emission spectrometry. When these values are converted on the basis of their oxides, i.e., alumina and silica, the proportion of alumina in the titanium oxide particle is 0.50 times or more to 1.00 time or less the proportion of silica in the titanium oxide particle in terms of a mass ratio.

Examples of a surface treatment method of titanium oxide include wet treatment and dry treatment. For example, the surface treatment can be performed by dispersing titanium oxide in a liquid medium and then allowing the titanium oxide to react with a surface treating agent, such as sodium aluminate and sodium silicate. The surface treatment can be adjusted to desired characteristics by appropriately changing the proportions of the surface treatment agents. In addition to alumina and silica, inorganic oxides, such as zinc oxide and zirconia, and organic substances, such as polyols, can be used for the surface treatment as long as the advantageous effects of the present disclosure are not impaired.

The ink may contain an additional pigment other than titanium oxide as long as the advantageous effects of the present disclosure are not impaired. In this case, a color ink other than a white ink can also be used. The additional pigment content of the ink is preferably 0.10% by mass or more to 5.00% by mass or less, more preferably 0.10% by mass or more to 1.00% by mass or less, based on the total mass of the ink.

Compound Represented by General Formula (1)

The ink contains a compound represented by the following general formula (1) as a dispersant for dispersing the titanium oxide particle. The amount of the compound represented by general formula (1) in the ink is preferably 0.01% by mass or more to 1.00% by mass or less, more preferably 0.02% by mass or more to 0.50% by mass or less, based on the total mass of the ink, (1)

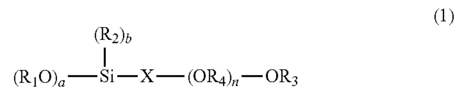

where in general formula (1), $R_1$, $R_2$ and $R_3$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

In general formula (1), $R_1$, $R_2$ and $R_3$ are each independently a hydrogen atom or an alkyl group having 1 to 4 carbon atoms. Examples of the alkyl group having 1 to 4 carbon atoms include a methyl group, an ethyl group, a n-propyl group, an i-propyl group and a n-butyl group. Among these, a methyl group can be used from the viewpoint of ease of hydrolysis. When each of $R_1$, $R_2$ and $R_3$ is an alkyl group having more than 4 carbon atoms, the compound is not easily hydrolyzed to form a silanol group, thereby failing to obtain an affinity for the titanium oxide particle. Thus, the titanium oxide particle cannot be stably dispersed, failing to obtain sufficient ejection stability of the ink. Here, a representing the number of RIO is 1 to 3, b representing the number of $R_2$ is 0 to 2 and a+b=3. In particular, a can be 3, and b can be 0, that is, all three substituents on the silicon atom can be RIO.

In general formula (1), each $R_4$ is independently an alkylene group having 2 to 4 carbon atoms. Examples of the alkylene group having 2 to 4 carbon atoms include an ethylene group, a n-propylene group, an i-propylene group and n-butylene group. In particular, an ethylene group can be used. The number of $OR_4$, that is, n (average value) representing the number of an alkylene oxide group is 6 to 24. When n is less than 6, the length of the alkylene oxide chain is too short, and thus a repulsive force due to steric hindrance is not sufficiently obtained, thereby failing to obtain sufficient ejection stability. When n is more than 24, the length of the alkylene oxide chain is too long, so that the compound has higher hydrophilicity and is more likely to be present in free form in an aqueous medium. Thus, an affinity for the surface hydroxy group of the titanium oxide particle cannot be sufficiently obtained, and the aggregation of the titanium oxide particle cannot be suppressed. Accordingly, the titanium oxide particle cannot be stably dispersed, and sufficient ejection stability of the ink cannot be obtained.

In general formula (1), X is a single bond or an alkylene group having 1 to 6 carbon atoms. When X is a single bond, it means that the silicon atom and $OR_4$ are directly bonded to each other. Examples of the alkylene group having 1 to 6 carbon atoms includes a methylene group, an ethylene group, a n-propylene group, an i-propylene group, a n-butylene group, a n-pentylene group and a n-hexylene group. In particular, a n-propylene group can be used. When X is an alkylene group having more than 6 carbon atoms, the hydrophobicity of the compound represented by general formula (1) is too high; thus, the titanium oxide particle cannot be stably dispersed, failing to obtain sufficient ejection stability of the ink.

The compound, which serves as a dispersant for the titanium oxide particle, represented by general formula (1) can be a compound represented by the following general formula (2). The compound represented by general formula (2) has three $OR_1$ groups attached to the silicon atom. Thus, the compound can be partially hydrolyzed in an aqueous medium to form three hydroxy groups attached to the silicon atom, thereby making it possible to increase portions each having an affinity for the titanium oxide particle. In addition, the compound represented by the following general formula (2) has repeating units of an ethylene oxide group. Thus, the ethylene oxide chain is appropriately elongated in an aqueous medium, and a repulsive force due to steric hindrance can be obtained, (2)

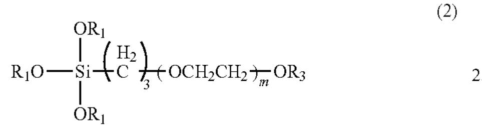

where in general formula (2), $R_1$ and $R_3$ are each independently a hydrogen atom or an alkyl group having 1 to 4 carbon atoms, and m is 8 to 24.

The amount of the compound represented by general formula (1) contained in the ink can be 0.002 times or more to 0.10 times or less the amount of the titanium oxide particle contained in the aqueous ink in terms of a mass ratio. When the mass ratio is less than 0.002 times, the effect of stably dispersing the titanium oxide particle is weak. Thus, the ejection stability of the ink is not sufficiently obtained, in some cases. When the mass ratio is more than 0.10 times, the proportion of the compound represented by general formula (1) is too high; thus, the intermolecular condensation (self-condensation) of the compound represented by general formula (1) occurs easily. Accordingly, the compound represented by general formula (1) is consumed without acting as a dispersant; thus, the effect of stably dispersing the titanium oxide particle is weak, and the ejection stability of the ink is not sufficiently obtained, in some cases.

The compound represented by general formula (1) forms hydrogen bonds with the surface hydroxy groups of the titanium oxide particle, and some of them are thought to form covalent bonds due to dehydration reactions. However, in an embodiment of the present disclosure, the compound represented by general formula (1) can disperse the titanium oxide particle even if the compound does not form a covalent bond with the titanium oxide particle. That is, the amount of compound, represented by general formula (1), covalently bonded to the titanium oxide particle is very small and negligible. Thus, the amount of compound, represented by general formula (1), covalently bonded to the titanium oxide particle is not included in the titanium oxide particle content. As a result of studies by the inventors, it has been found that when the amount of compound, represented by general formula (1), covalently bonded to the titanium oxide particle is too large, the ejection stability of the ink is deteriorated. The reason for this is considered to be as follows: Typically, in a liquid medium, such as water, having a high dielectric constant, an electrostatic attractive force is less likely to act, and thus the titanium oxide particles freely move without being greatly affected by the surrounding environment. However, when the compound represented by general formula (1) is covalently bonded to the titanium oxide particle, a hydrophilic moiety ($OR_4$ moiety) of the structure of general formula (1) forms a hydrogen bond with a water molecule, thereby affecting the motion of the titanium oxide particle, in some cases. Thus, in a situation in which deformation due to instantaneous pressure is applied to the liquid as in the case of an ejection of ink jet ejection, the above-described properties appear as a difference in ejection characteristics. For this reason, the amount of compound, represented by general formula (1), covalently bonded to the titanium oxide particle can be 0.001 times or less the amount of the titanium oxide particle contained in the aqueous ink in terms of a mass ratio. When the mass ratio is more than 0.001 times, the ejection stability of the ink is not sufficiently obtained, in some cases. The mass ratio may be 0.000 times. The amount of compound, represented by general formula (1), covalently bonded to the titanium oxide particle can be calculated by, for example, thermogravimetric analysis.

Resin

The ink can contain a resin. Examples of the resin include acrylic resins, urethane resins and urea resins. In particular, an acrylic resin can be used. The resin content of the ink is preferably 1.00% by mass or more to 25.00% by mass or less, more preferably 3.00% by mass or more to 15.00% by mass or less, particularly preferably 5.00% by mass or more to 15.00% by mass or less, based on the total mass of the ink.

The resin can be contained in the ink for the purpose of improving various properties of recorded images, such as scratch resistance and concealability. Examples of the form of the resin include a block copolymer, a random copolymer, a graft copolymer and a combination of these copolymers. Moreover, the resin may be a water-soluble resin that is soluble in an aqueous medium, or may be a resin particle that is dispersed in an aqueous medium. The resin particle need not contain a coloring material.

In this specification, the "water-soluble resin" means that when the resin is neutralized with an alkali in an amount equivalent to the acid value of the resin, the resin is present in an aqueous medium in a state in which a particle whose particle size can be measured by a dynamic light scattering method is not formed. Whether the resin is soluble in water can be determined in accordance with the following method: First, a liquid (resin solid content: 10% by mass) containing a resin neutralized with an alkali (for example, sodium hydroxide or potassium hydroxide) equivalent to the acid value is prepared. The prepared liquid is diluted to 10 times (on a volume basis) with deionized water to prepare a sample solution. Then, when the particle size of the resin in the sample solution is measured by a dynamic light scattering method, if a particle having a particle size is not measured, the resin can be determined to be soluble in water. The measurement conditions at this time can be set as follows: for example, SetZero: 30 seconds, the number of measurements: 3 times and the measurement time: 180 seconds. As the particle size distribution measurement apparatus, for example, a particle size analyzer by a dynamic light scattering method (for example, trade name "UPA-EX150", available from Nikkiso Co., Ltd.) can be used. Of course, the particle size distribution measurement apparatus and measurement conditions used are not limited to those described above.

The acid value of the water-soluble resin is preferably 80 mgKOH/g or more to 250 mgKOH/g or less, more preferably 100 mgKOH/g or more to 200 mgKOH/g or less. When the resin particle is used, the acid value of the resin particle is preferably 0 mgKOH/g or more to 50 mgKOH/g or less. The weight-average molecular weight of the resin is preferably 1,000 or more to 30,000 or less, more preferably 5,000 or more to 15,000 or less. The weight-average molecular weight of the resin is a value measured by gel permeation chromatography (GPC) in terms of polystyrene.

Aqueous Medium

The ink is an aqueous ink containing water as an aqueous medium. The ink can contain water or an aqueous medium that is a mixed solvent of water and a water-soluble organic solvent. As the water, deionized water (ion-exchanged water) can be used. The water content of the ink can be 50.00% by mass or more to 95.00% by mass or less based on the total mass of the ink.

The water-soluble organic solvent is not particularly limited as long as it is water-soluble (it can dissolve in water at any ratio at 25° C.). Specific examples of the water-soluble organic solvent that can be used include monohydric or polyhydric alcohols, alkylene glycols, glycol ethers, nitrogen-containing polar compounds and sulfur-containing polar compounds. The water-soluble organic solvent content of the ink is preferably 3.00% by mass or more to 50.00% by mass or less, more preferably 10.00% by mass or more to 40.00% by mass or less, based on the total mass of the ink. At a water-soluble organic solvent content of less than 3.00% by mass, the ink may stick in an ink jet recording apparatus and may have insufficient sticking resistance. At a water-soluble organic solvent content of more than 50.00% by mass, ink supply failure may occur.

Additional Additive

In addition to the above-described additives, the ink may contain various additives, such as a surfactant, a pH adjuster, a rust preventive, a preservative, an antifungal agent, an antioxidant, a reducing inhibitor, an evaporation promoter and a chelating agent, as needed. In particular, the ink can contain a surfactant. The surfactant content of the ink is preferably 0.10% by mass or more to 5.00% by mass or less, more preferably 0.10% by mass or more to 2.00% by mass or less, based on the total mass of the ink. Examples of the surfactant include anionic surfactants, cationic surfactants and nonionic surfactants. Among these, a nonionic surfactant that has a low affinity for titanium oxide particle and that is effective even in a small amount can be used because the surfactant is used to adjust various physical properties of the ink.

Physical Properties of Ink

The ink is used for an ink jet recording method; thus, the physical properties thereof can be appropriately controlled. The surface tension of the ink at 25° C. is preferably 10 mN/m or more to 60 mN/m or less, more preferably 20 mN/m or more to 40 mN/m or less. The surface tension of the ink can be adjusted by appropriately determining the type and amount of the surfactant in the ink. The viscosity of the ink at 25° C. can be 1.0 mPa's or more to 10.0 mPa's or less. The pH of the ink at 25° C. can be 7.0 or more to 9.0 or less. When the pH of the ink is within the above range, the formation of silanol groups by hydrolysis of the compound represented by general formula (1) proceeds, and thus the weak affinity between the titanium oxide particle and the compound represented by general formula (1) is effectively exhibited. The pH of the ink can be measured with a general-purpose pH meter equipped with, for example, a glass electrode.

Method for Producing Ink

A method for producing an ink according to the present disclosure includes mixing a titanium oxide particle dispersion and another ink component. As the titanium oxide particle dispersion, a titanium oxide particle dispersion produced by a production method described later is used. Examples of another ink component include water to be added further, a water-soluble organic solvent, a resin and the above-described "additional additive". The method for producing an ink may be performed, for example, by placing the titanium oxide particle dispersion and another ink component to a suitable container and stirring the mixture. Conditions, such as the stirring speed, the temperature and the time, can be appropriately set according to desired conditions. In addition, known production steps may be combined.

Method for Producing Titanium Oxide Particle Dispersion

The method for producing a titanium oxide particle dispersion according to an embodiment of the present disclosure is used for producing an aqueous ink for ink jet recording. The method includes a step (first step) of allowing a predetermined treatment agent to react with the surface of titanium oxide to prepare titanium oxide particle containing titanium oxide whose surface is covered with alumina and silica. The method further includes, after the first step, a dispersion step (second step) of dispersing the titanium oxide particle in a liquid medium with a compound, represented by general formula (1), for dispersing the titanium oxide particle. Hereinafter, each step will be described in detail.

First Step

The first step is a step of preparing a titanium oxide particle containing titanium oxide whose surface is covered with alumina and silica. As the titanium oxide particle, a titanium oxide particle covered with alumina and silica in advance may be used, or an untreated titanium oxide particle subjected to coating treatment may be used. Examples of a coating treatment method include wet treatment and dry treatment. Of these, wet treatment can be used because uniform surface treatment can be performed. Specific examples thereof include a method in which a surface treating agent is added to a dispersion of titanium oxide as a raw material. Examples of the surface treating agent include sodium aluminate and sodium silicate. Conditions for the surface treatment may be typical ones. In addition, various properties of a titanium oxide particle may be adjusted by further subjecting the titanium oxide particle that has been covered with alumina and silica in advance to coating treatment.

After the first step, the surface-treated titanium oxide (titanium oxide particle) may be in a dried state or in a state in which it is contained in a liquid medium such as water. To facilitate handling in the subsequent second step, the titanium oxide particle can be in a state in which it is contained in a liquid medium. The concentration of the titanium oxide particle in the liquid medium can be set from the viewpoint of efficiency of the second step and ease of handling. Specifically, the titanium oxide particle content of the liquid containing the titanium oxide particle can be 20.00% by mass or more to 60.00% by mass or less based on the total mass of the liquid.

Second Step

The second step is a dispersion step of dispersing the titanium oxide particle in the liquid medium with the compound, represented by general formula (1), for dispersing the titanium oxide particle. If necessary, a pH adjuster and various additives may be used. In the second step, the titanium oxide particle is dispersed using the compound, serving as a dispersant, represented by general formula (1) by treatment, such as application of a shearing force necessary for obtaining a desired particle size distribution. A known dispersion method, such as media dispersion or medialess dispersion, can be used in the second step. Examples of a disperser for media dispersion include paint shakers, bead mills, sand mills, ball mills and roll mills. Examples of a disperser for medialess dispersion include ultrasonic homogenizers and high-pressure homogenizers. The second step may be performed using a combination of two or more of the above-described dispersers.

The titanium oxide particle dispersion obtained in the second step is stored for a certain period of time if necessary, and then used for preparation of an aqueous ink for ink jet recording. From such a viewpoint, the concentration of titanium oxide particle in the dispersion can be set. Specifically, the titanium oxide particle content of the titanium oxide particle dispersion can be 20.00% by mass or more to 60.00% by mass or less based on the total mass of the dispersion.

The temperature in the second step can be freely set. The second step is performed in an aqueous liquid medium; thus, the temperature is preferably 0° C. or higher and 100° C. or lower, more preferably 10° C. or higher and 40° C. or lower from the viewpoints of heat generation during the step and reliability of the medium when a medium dispersion method is used. The time for the second step may be adjusted in accordance with, for example, the apparatus used and the concentration of the dispersion, and may be freely set as long as the titanium oxide particle is not excessively dispersed. For example, when the dispersion step is performed at 25° C. with a paint shaker using 0.5-mm zirconia beads, the dispersion time can be 10 hours or more to 20 hours or less.

A preliminary dispersion step may be performed in order to mix the components including the titanium oxide particle, wet the components in the liquid medium, and facilitate dispersion. In the preliminary dispersion step, it is possible to use the dispersion method and apparatus described as those usable in the second step.

pH Adjuster

In the second step, a pH adjuster can be used in order to control the state of the surface hydroxy group of the titanium oxide particle. The pH adjuster may be an acidic compound or a basic compound. Of these, a basic compound can be used because the surface hydroxy group of the titanium oxide particles can be maintained in an anionic state. When the liquid medium is alkaline, some surface hydroxy groups of the titanium oxide particle are ionized, an electric double layer is formed, and good dispersion stability due to repulsion of electric charges can be obtained. Examples of the basic compound include ammonia; organic ammonium compounds; and alkali metal hydroxides, such as potassium hydroxide and sodium hydroxide. Among them, potassium hydroxide can be used in consideration of being carried into the ink from the produced dispersion. The pH of the liquid medium in the second step, which is adjusted using a pH adjuster, can be 7.0 or more to 12.5 or less. When the pH is more than 12.5, silica covering the surface of the titanium oxide particle may be dissolved. The pH adjuster may be continuously added at a freely-selected timing in order to maintain the pH of the liquid medium within the above-described range.

Liquid Medium

The second step can be performed in a liquid medium, such as an aqueous liquid medium. As the aqueous liquid medium, water alone or an aqueous medium using water as a main solvent in combination with a protic or aprotic organic solvent can be used. The aqueous medium is a mixed solvent of water and an organic solvent. As the organic solvent, an organic solvent that is miscible with or dissolves in water at any ratio can be used. Among them, a uniform mixed solvent containing water in an amount of 50% by mass or more can be used as the aqueous medium. As the water, ion-exchanged water or deionized water can be used.

The protic organic solvent is an organic solvent having a hydrogen atom (acidic hydrogen atom) attached to oxygen or nitrogen. The aprotic organic solvent is an organic solvent having no acidic hydrogen atom. Examples of the organic solvent include alcohols; alkylene glycols; polyalkylene glycols; glycol ethers; glycol ether esters; carboxylic acid amides; ketones; ketoalcohols; cyclic ethers; nitrogen-containing compounds; and sulfur-containing compounds.

Post-Treatment

The produced titanium oxide particle dispersion can be subjected to a typical post-treatment method, such as purification, and then used for the production of an aqueous ink for ink jet recording. In the case where only water is used as a liquid medium without using an organic solvent, the obtained dispersion may be directly used for preparing an ink, or the dispersion may be used as a final dispersion after washing or adjusting the titanium oxide particle content. When a liquid medium containing an organic solvent is used, the organic solvent can be removed. Examples of a method for removing the organic solvent include a method in which water is added while the organic solvent is removed under reduced pressure or by heating using, for example, an evaporator to prepare an aqueous titanium oxide particle dispersion. Moreover, there is also a method in which an operation of removing the organic solvent by, for example, ultrafiltration and then adding water is repeated. In particular, in the case of preparing a dispersion in which a titanium oxide particle is dispersed in an aqueous medium, by ion-dissociating the surface hydroxy group of the titanium oxide particle, the dispersion state can be maintained more stably due to a repulsive force based on electrostatic repulsion. Thus, for example, a pH adjuster may be added to make the dispersion alkaline, as needed.

Ink Cartridge

An ink cartridge according to an embodiment of the present disclosure includes an ink and an ink storage portion storing the ink. The ink contained in this ink storage portion is the above-described aqueous ink (white ink) according to an embodiment of the present disclosure. FIG. 1 is a cross-sectional view schematically illustrating an exemplary embodiment of an ink cartridge of the present disclosure. As illustrated in FIG. 1, an ink supply port 12 for supplying an ink to a recording head is provided on the bottom face of the ink cartridge. The interior of the ink cartridge is an ink storage portion for storing the ink. The ink storage portion includes an ink storage chamber 14 and an absorber storage chamber 16, which communicate with each other through a communication port 18. The absorber storage chamber 16 communicates with the ink supply port 12. The ink storage chamber 14 contains a liquid ink 20. The absorber storage chamber 16 receives absorbers 22 and 24 that hold the ink in an impregnated state. The ink storage portion may be configured to include an absorber that holds the total amount of ink stored without having an ink storage chamber for storing a liquid ink. The ink storage portion does not have an absorber, and may be configured to store the total amount of ink in a liquid state. Furthermore, the ink cartridge may be configured to include an ink storage portion and a recording head.

Ink Jet Recording Method

The ink jet recording method according to an embodiment of the present disclosure is a method for recording an image on a recording medium by ejecting the above-described aqueous ink according to an embodiment of the present disclosure from an ink jet recording head. Examples of a method for ejecting an ink include a method for applying mechanical energy to an ink and a method for applying thermal energy to an ink.

In an embodiment of the present disclosure, a method for ejecting an ink by applying thermal energy to the ink can be employed. Steps included in the ink jet recording method may be the same as known steps, except that the ink according to an embodiment of the present disclosure is used. For example, when an image is recorded with the white ink, the method can be employed to a general-purpose ink jet recording method as it is. When undercoating treatment for a color ink is performed with the white ink, an image may be recorded by applying the color ink (for example, an ink of black, cyan, magenta or yellow) so as to overlap at least part of a region to which the white ink is applied. In addition, the undercoating treatment can also be used for back printing in which the white ink is applied so as to overlap at least part of a region to which a color ink is applied. The recording medium is not particularly limited, but since the aqueous ink according to an embodiment of the present disclosure can be used as a white ink, a transparent or colored recording medium can be used. The recording medium may be a poorly absorbable medium (non-absorbable medium), such as a resin film having low liquid medium absorbency.

Figure 2A:
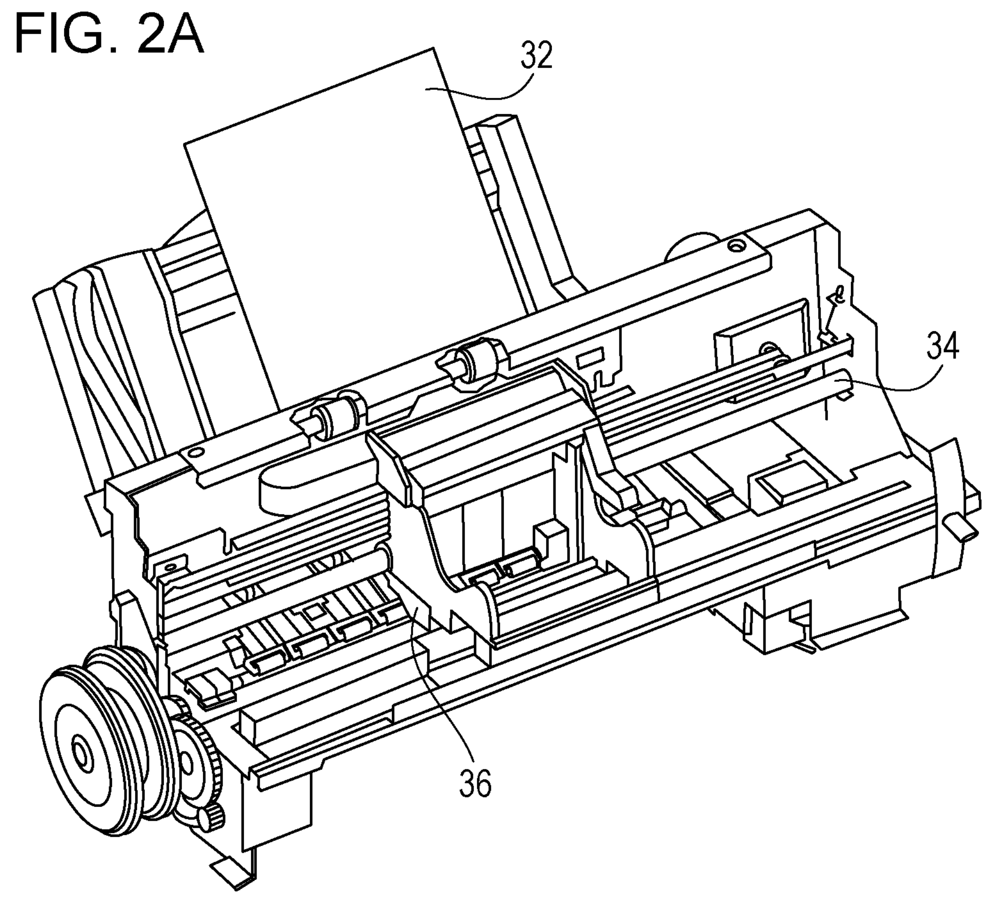
FIG. 2A is a perspective view schematically illustrating an example of a principal part of an ink jet recording apparatus used in an ink jet recording method according to the present disclosure.
Figure 2B:
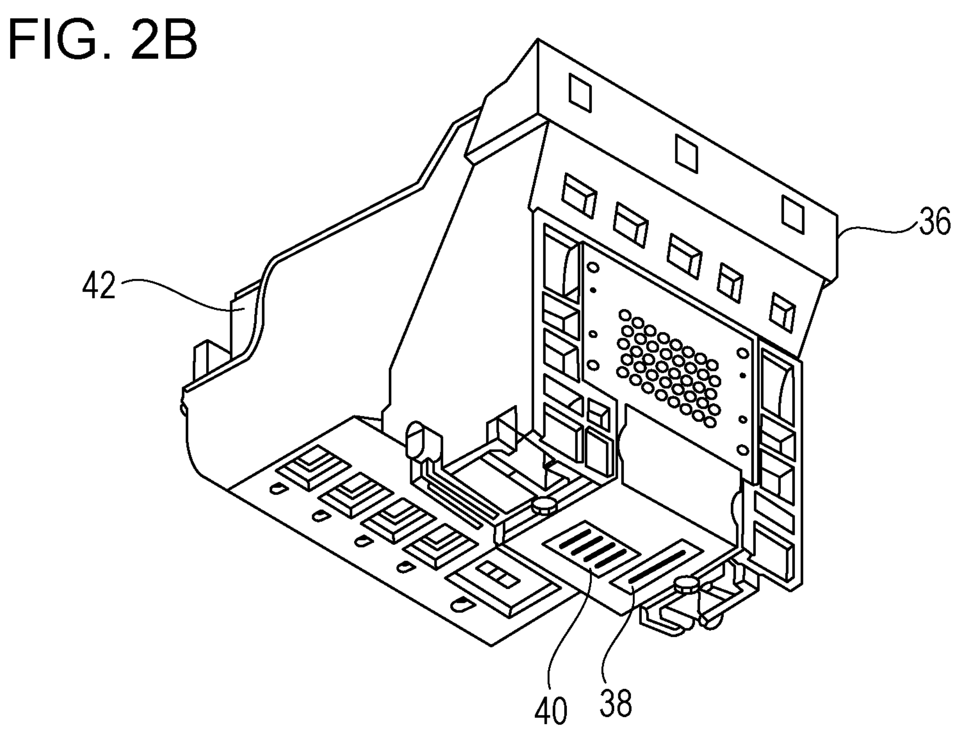
FIG. 2B is a perspective view schematically illustrating an example of a head cartridge used in an ink jet recording method according to the present disclosure.

FIG. 2A is a perspective view schematically illustrating an example of a principal part of an ink jet recording apparatus used in an ink jet recording method according to the present disclosure, and FIG. 2B is a perspective view schematically illustrating an example of a head cartridge used in an ink jet recording method according to the present disclosure. The ink jet recording apparatus includes a conveyance unit (not illustrated) configured to convey a recording medium 32; and a carriage shaft 34. A head cartridge 36 can be mounted on the carriage shaft 34. The head cartridge 36 includes recording heads 38 and 40, and is configured in such a manner that an ink cartridge 42 is set therein. While the head cartridge 36 is conveyed along the carriage shaft 34 in the main scanning direction, an ink (not illustrated) is ejected from the recording heads 38 and 40 toward the recording medium 32. Then the recording medium 32 is conveyed in the sub-scanning direction with a conveyance unit (not illustrated), thereby recoding an image on the recording medium 32.

Multipass recording can be used in which the ink is applied to the unit region of the recording medium in multiple relative scans of the recording heads and the recording medium. In particular, the application of white ink to the unit area and the application of color ink thereto can be performed in different relative scans. This allows more time for the inks to come into contact with each other, and mixing is more likely to be suppressed. The unit region can be set as any region, such as one pixel or one band.

EXAMPLES

Hereinafter, the present disclosure will be described in more detail by way of examples and comparative examples. The present disclosure is not limited to the following examples as long as it is within the scope of the present disclosure. Regarding the amounts of components, "part(s)" and "%" are on a mass basis, unless otherwise specified. A titanium oxide particle dispersion is referred to as a "pigment dispersion liquid".

Preparation of Titanium Oxide

Commercially available titanium oxide particles subjected to surface treatment in advance and titanium oxide particles prepared by subjecting untreated titanium oxide to surface treatment were used. The 50% cumulative particle size ($D_{50}$) of the titanium oxide particles on a volume basis were measured with a particle size analyzer (trade name: "Nanotrac WaveII-EX150", available from MicrotracBEL Corp.) by a dynamic light scattering method. Table 1 presents the properties of the titanium oxide particles. In Table 1, TITANIX: JR, JR-403, JR-800, JR-806, JR-805, JR-301, JR-405 and JR-600A are trade names of rutile-type titanium oxide available from Tayca Corporation. TITONE: R-62N and R-7E are trade names of rutile-type titanium oxide available from Sakai Chemical Industry Co., Ltd. TIPAQUE: PFC-208, R-780-2, PFC-211 and R-780 are trade names of rutile-type titanium oxide available from Ishihara Sangyo Kaisha, Ltd.

Measurement of Coating Amount of Alumina and Silica

The proportions of alumina and silica in the titanium oxide particle, that is, the coating amounts of alumina and silica were measured as follows: A liquid obtained by adding the prepared titanium oxide particle to nitric acid was used as a sample. Quantitative analysis of aluminum and silicon elements was performed with an inductively coupled plasma (ICP) optical emission spectrometer. At this time, assuming that all the atoms covering the surface of the titanium oxide were in the form of oxides, the obtained values of aluminum and silicon were converted into values on the basis of oxides, that is, alumina and silica, and the mass ratio was calculated.

Titanium Oxide Particles 1 to 8

The surface treatment of titanium oxide was performed by a wet process to produce titanium oxide particles 1 to 8. In the surface treatment by the wet process, untreated titanium oxide was brought into contact with surface treating agents (for example, sodium aluminate and sodium silicate). In the surface treatment, the amounts and proportions of the surface treating agents used were appropriately adjusted to achieve desired ratios.

Specifically, 300 parts of non-surface-treated rutile-type titanium oxide (trade name: "TITANIX JR", available from Tayca Corporation) and 700 parts of deionized water were mixed using a homogenizer. The temperature was increased to 90° C. while agitating. Potassium hydroxide (pH adjuster) was added to adjust the pH to 10.5. Sodium silicate was added thereto. Dilute sulfuric acid (pH adjuster) was added over about 1 hour to adjust the pH to 5.0. The reaction was continued for about 1 hour. Then sodium aluminate was added at 90° C. in small amounts. To maintain the pH, dilute sulfuric acid was used in combination to maintain the pH at 6.0 or more to 8.0 or less. After the addition of sodium aluminate, the reaction was continued for about 1 hour to obtain a dispersion. The dispersion was cooled to 25° C., purified by repeating sedimentation with a centrifugal separator and re-dispersion in ion-exchanged water and dried at 120° C. to obtain each titanium oxide particle surface-treated with at least one of alumina and silica. Table 1 presents the properties of titanium oxide particles 1 to 8.

Titanium Oxide Particles 9 to 22

As titanium oxide particles 9 to 22, commercially available titanium oxide particles (including those previously surface-treated with alumina and/or silica) were used. Table 1 also presents the properties of titanium oxide particles 9 to 22. Some commercially available titanium oxide particles contained inorganic oxides, such as zinc oxide and zirconia, and organic compounds, such as polyol, in addition to alumina and silica, but the proportion thereof was about 1.0% at most. Thus, these were collectively included in the proportion T (%) of titanium oxide in the titanium oxide particle ("Titanium oxide T (%)" in Table 1), for convenience.

minutes. As "sodium hydride", a 60% dispersion liquid of sodium hydride in paraffin was used. The dispersion was used so as to achieve the amount of sodium hydride given in Table 2. The mixture was stirred at 25° C. while the bromide described in Table 2 was added dropwise. The stirring was continued for another 12 hours after the completion of the dropwise addition, thereby preparing a mixture containing a reaction product. After unreacted sodium hydride and a neutralized product (sodium bromide) were separated by filtration from the mixture containing the reaction product, THF was removed under reduced pressure to give a concentrate. The concentrate was dissolved in 500 parts of deionized water. This aqueous solution was extracted three

TABLE 1

| Properties of titanium oxide particle | | | | | | | | | |
|---|---|---|---|---|---|---|---|---|---|
| | | Proportion in titanium oxide particle (%) | | | | | | | |
| Titanium oxide particle | Type | Titanium oxide T (%) | Aluminum element a (%) | Alumina A (%) | Silicon elements (%) | Silica S (%) | Value of a/s (times) | Value of A/S (times) | $D_{50}$ (nm) |
| 1 | Sample prepared by surface-treating "TITANIX JR" (trade name) | 94.9 | 1.1 | 2.0 | 1.4 | 3.1 | 0.73 | 0.65 | 290 |
| 2 | Sample prepared by surface-treating "TITANIX JR" (trade name) | 94.2 | 1.0 | 1.9 | 1.8 | 3.9 | 0.55 | 0.49 | 290 |
| 3 | Sample prepared by surface-treating "TITANIX JR" (trade name) | 95.9 | 1.1 | 2.1 | 0.9 | 2.0 | 1.19 | 1.05 | 290 |
| 4 | Sample prepared by surface-treating "TITANIX JR" (trade name) | 98.5 | 0.0 | 0.0 | 0.7 | 1.5 | 0.00 | 0.00 | 290 |
| 5 | Sample prepared by surface-treating "TITANIX JR" (trade name) | 99.3 | 0.2 | 0.3 | 0.2 | 0.4 | 0.85 | 0.75 | 290 |
| 6 | Sample prepared by surface-treating "TITANIX JR" (trade name) | 98.4 | 0.3 | 0.6 | 0.5 | 1.0 | 0.68 | 0.60 | 290 |
| 7 | Sample prepared by surface-treating "TITANIX JR" (trade name) | 94.3 | 1.0 | 1.9 | 1.8 | 3.8 | 0.57 | 0.50 | 290 |
| 8 | Sample prepared by surface-treating "TITANIX JR" (trade name) | 96.0 | 1.1 | 2.0 | 0.9 | 2.0 | 1.13 | 1.00 | 290 |
| 9 | 'TITANIX JR-403" (trade name) | 95.7 | 1.1 | 2.0 | 1.1 | 2.3 | 0.98 | 0.87 | 250 |
| 10 | "TITANIX JR-800" (trade name) | 93.7 | 1.2 | 2.3 | 1.9 | 4.0 | 0.65 | 0.58 | 270 |
| 11 | "TITANIX JR-806" (trade name) | 93.8 | 1.1 | 2.1 | 1.9 | 4.1 | 0.58 | 0.51 | 250 |
| 12 | "TITONE R-62N" (trade name) | 93.1 | 1.5 | 2.8 | 1.9 | 4.1 | 0.77 | 0.68 | 260 |
| 13 | "TIPAQUE PFC-208" (trade name) | 92.1 | 1.5 | 2.8 | 2.4 | 5.1 | 0.62 | 0.55 | 250 |
| 14 | "TITANIX JR-805" (trade name) | 91.7 | 1.6 | 3.0 | 2.5 | 5.3 | 0.64 | 0.57 | 290 |
| 15 | "TIPAQUE R-780-2" (trade name) | 85.0 | 2.9 | 5.5 | 4.4 | 9.5 | 0.66 | 0.58 | 240 |
| 16 | 'TIPAQUE PFC-211" (trade name) | 87.2 | 2.4 | 4.6 | 3.8 | 8.2 | 0.6 | 0.56 | 250 |
| 17 | "TITONE R-7E" (trade name) | 90.2 | 1.3 | 2.5 | 3.4 | 7.3 | 0.39 | 0.34 | 230 |
| 18 | "TIPAQUE R-780" (trade name) | 93.6 | 1.8 | 3.4 | 1.4 | 3.0 | 1.28 | 1.13 | 240 |
| 19 | "TITANIX JR-301" (trade name) | 96.9 | 1.5 | 2.8 | 0.1 | 0.3 | 10.6 | 9.33 | 300 |
| 20 | 'TITANIX JR-405" (trade name) | 99.1 | 0.5 | 0.9 | 0.0 | 0.0 | — | — | 210 |
| 21 | "TITANIX JR-600A" (trade name) | 98.2 | 1.0 | 1.8 | 0.0 | 0.0 | — | — | 250 |
| 22 | "TITANIX JR" (trade name) | 100.0 | 0.0 | 0.0 | 0.0 | 0.0 | — | — | 270 |

Preparation of Compound Represented by General Formula (1)

The compound represented by general formula (1) was synthesized by the following procedure. Synthesis conditions of compounds synthesized as compounds represented by general formula (1) and comparative compounds are given in Table 2, and the structures thereof are given in Table 3. The compound represented by general formula (1) can be synthesized by allylation and hydrosilylation of a raw material (for example, a polyalkylene glycol monoalkyl ether).

Compound 1 to 13 and Comparative Compound 14

A raw material, a base and a solvent listed in Table 2 were fed into a three-necked flask equipped with a stirring bar and a nitrogen inlet. The mixture was stirred at 25° C. for 30 times with 200 mL of hexane, and then extracted with 200 mL of dichloromethane. The solvent containing the product was dried by the addition of magnesium sulfate and concentrated under reduced pressure to give each allylated compound (allylation step).

The allylated raw material and a silane compound given in Table 2 were fed into a passivated, dry round-bottom flask equipped with a stirring bar and an argon inlet. The mixture was stirred at 85° C. Then, 0.54 parts of a 65 mmol/L solution of chloroplatinic acid monohydrate in isopropyl alcohol and water was added thereto. The mixture was heated at 85° C. for 5 hours. After the completion of the reaction, the mixture was allowed to cool to 25° C. The excess silane compound was removed under reduced pressure. The residue was purified by column chromatography using a silica gel, which had been passivated with triethoxysilane, as a support to obtain each compound (hydrosilylation step). In the purification by the column chromatography, an eluent of ethyl acetate/hexane/ethanol=85/15/5 (volume basis) was used.

Comparative Compound 15

Raw materials and a solvent described in Table 2 were fed into a three-necked flask equipped with a stirring bar, a reflux condenser and an argon inlet, and the raw materials were dissolved. A bromide described in Table 2 was added dropwise at 80° C. over about 1 hour under stirring, and the resulting mixture was refluxed for 30 minutes. After the completion of the reaction, THF was removed under reduced pressure, and 300 parts of deionized water and a base described in Table 2 were added. The resulting liquid containing the reaction product was allowed to cool to 25° C. and extracted twice with 200 mL of diethyl ether. The solvent containing the product was dried over magnesium sulfate and evaporated under reduced pressure to give an allylated compound. The hydrosilylation step was performed in the same manner as for compounds 1 to 13 and comparative compound 14 to give comparative compound 15.

Comparative Compound 16

Raw materials and a solvent described in Table 2 were fed into a three-necked flask equipped with a stirring bar and a nitrogen inlet, and the raw materials were dissolved. The mixture was stirred at 55° C. for 3 hours. After the completion of the reaction, the solvent was removed under reduced pressure to give a concentrate. Then 100 parts of ethanol were added to the concentrate, followed by filtration. The residue was washed with ethanol to remove impurities. A liquid component in the filtrate was removed under reduced pressure to give an allylated compound. The hydrosilylation step was performed in the same manner as for compounds 1 to 13 and comparative compound 14 to give comparative compound 16.

TABLE 2

Synthesis conditions of compound represented by general formula (1)

| | Allylation step | | | | | | | | Hydrosilylation step | | |
|---|---|---|---|---|---|---|---|---|---|---|---|
| | | | Base | | Solvent | | Bromide | | Allyated raw material | Silane compound | |
| Compound | Raw material Type | Amount used (parts) | Type | Amount used (parts) | Type | Amount used (parts) | Type | Amount used (parts) | Amount used (parts) | Type | Amount used (parts) |
| 1 | ethylene glycol monomethyl ether (n = 1) | 4.6 | sodium hydride | 2.9 | THF | 200 | allyl bromide | 8.7 | 1.4 | trimethoxysilane | 18.4 |
| 2 | polyethylene glycol monomethyl ether (n = 4) | 12.5 | sodium hydride | 2.9 | THF | 200 | allyl bromide | 8.7 | 3.0 | trimethoxysilane | 18.4 |
| 3 | polyethylene glycol monomethyl ether (n = 6) | 17.8 | sodium hydride | 2.9 | THF | 200 | allyl bromide | 8.7 | 4.0 | trimethoxysilane | 18.4 |
| 4 | polyethylene glycol monomethyl ether (n = 8) | 23.1 | sodium hydride | 2.9 | THF | 200 | allyl bromide | 8.7 | 5.1 | trimethoxysilane | 19.4 |
| 5 | polyethylene glycol monomethyl ether (n = 10) | 28.3 | sodium hydride | 2.9 | THF | 200 | allyl bromide | 8.7 | 6.1 | trimethoxysilane | 18.4 |
| 6 | polyethylene glycol monomethyl ether (n = 10) | 28.3 | sodium hydride | 2.9 | THF | 200 | allyl bromide | 8.7 | 6.1 | trimethoxysilane | 23.4 |
| 7 | polyethylene glycol monomethyl ether (n = 10) | 28.3 | sodium hydride | 2.9 | THF | 200 | allyl bromide | 8.7 | 6.1 | methyldimeth-oxysilane | 16.5 |
| 8 | polyethylene glycol monomethyl ether (n = 12) | 33.6 | sodium hydride | 2.9 | THE | 200 | allyl bromide | 8.7 | 7.2 | trimethoxysilane | 18.4 |
| 9 | polyethylene glycol monomethyl ether (n = 24) | 49.5 | sodium hydride | 2.9 | THF | 200 | allyl bromide | 8.7 | 13.5 | trimethoxysilane | 18.4 |
| 10 | polyethylene glycol monomethyl ether (n = 26) | 54.7 | sodium hydride | 2.9 | THF | 200 | allyl bromide | 8.7 | 14.6 | trimethoxysilane | 18.4 |
| 11 | polyethylene glycol monomethyl ether (n = 10) | 36.7 | sodium hydride | 2.9 | THE | 200 | allyl bromide | 8.7 | 7.8 | trimethoxysilane | 18.4 |
| 12 | polyethylene glycol monomethyl ether (n = 10) | 28.3 | sodium hydride | 2.9 | THE | 200 | 7-bromo-1-heptene | 12.7 | 6.8 | trimethoxysilane | 18.4 |
| 13 | polyethylene glycol monomethyl ether (n = 10) | 28.3 | sodium hydride | 2.9 | THF | 200 | allyl bromide | 8.7 | 6.1 | trimethoxysilane | 38.6 |
| 14 (comparative) | glycidol | 4.4 | sodium hydride | 2.9 | THF | 200 | allyl bromide | 8.7 | 1.7 | trimethoxysilane | 18.4 |

TABLE 2-continued

Synthesis conditions of compound represented by general formula (1)

| Compound | Allylation step | | | | | | | | Hydrosilylation step | | |
|---|---|---|---|---|---|---|---|---|---|---|---|
| | Raw material | | Base | | Solvent | | Bromide | | Allyated raw material | Silane compound | |
| | Type | Amount used (parts) | Type | Amount used (parts) | Type | Amount used (parts) | Type | Amount used (parts) | Amount used (parts) | Type | Amount used (parts) |
| 15 (comparative) | ethylenediamine | 12.0 | sodium hydroxide | 4.1 | THF | 300 | allyl bromide | 12.1 | 1.4 | trimethoxysilane | 18.4 |
| 16 (comparative) | allylamine hydrochloride potassium cyanate | 9.3 8.9 | | — | ion-exchanged water | 50 | — | — | 1.4 | trimethoxysilane | 18.4 |

TABLE 3

Structure of synthesized compound represented by general formula (1)

| Compound | X | $R_1$ | $R_2$ | $R_3$ | $R_4$ | n | a | b | Compound name |
|---|---|---|---|---|---|---|---|---|---|
| 1 | n-propylene group | methyl group | — | methyl group | ethylene group | 1 | 3 | 0 | 3-(methoxyethoxy)-propyltrimethoxysilane |
| 2 | n-propylene group | methyl group | — | methyl group | ethylene group | 4 | 3 | 0 | 3-(methoxy(oxyethylene4)-propyltrimethoxysilane |
| 3 | n-propylene group | methyl group | — | methyl group | ethylene group | 6 | 3 | 0 | 3-(methoxy(oxyethylene6))-propyltrimethoxysilane |
| 4 | n-propylene group | methyl group | — | methyl group | ethylene group | 8 | 3 | 0 | 3-(methoxy(oxyethylene8))-propyltrimethoxysilane |
| 5 | n-propylene group | methyl group | — | methyl group | ethylene group | 10 | 3 | 0 | 3-(methoxy(oxyethylene10))-propyltrimethoxysilane |
| 6 | n-propylene group | ethyl group | — | methyl group | ethylene group | 10 | 3 | 0 | 3-(methoxy(oxyethylene10)-propyltriethoxysilane |
| 7 | n-propylene group | methyl group | methyl group | methyl group | ethylene group | 10 | 2 | 1 | 3-(methoxy(oxyethylene10)-propylmethyl-dimethoxysilane |
| 8 | n-propylene group | methyl group | — | methyl group | ethylene group | 12 | 3 | 0 | 3-(methoxy(oxyethylene12)-propyltrimethoxysilane |
| 9 | n-propylene group | methyl group | — | methyl group | ethylene group | 24 | 3 | 0 | 3-(methoxy(oxyethylene24)-propyltrimethoxysilane |
| 10 | n-propylene group | methyl group | — | methyl group | ethylene group | 2 | 3 | 0 | 3-(methoxy(oxyethylene26))-propyltrimethoxysilane |
| 11 | n-propylene group | methyl group | — | methyl group | propylene group | 10 | 3 | 0 | 3-(methoxy(oxypropylene10)-propyltrimethoxysilane |
| 12 | n-heptylene group | methyl group | — | methyl group | ethylene group | 10 | 3 | 0 | 3-(methoxy(oxyethylene10))-heptyltrimethoxysilane |
| 13 | n-propylene group | pentyl group | — | methyl group | ethylene group | 10 | 3 | 0 | 3-(methoxy(oxyethylene 10)-propyltripentoxysilane |
| 14 (com-paratve) | n-ipropylene group | methyl group | — | glycidyl group | methylene group | 1 | 3 | 0 | 3-glycidyloxypropyl-trimethoxysilane |
| 15 (com-parative) | n-propylene group | methyl group | — | $NHC_2H_4NH_2$ | | — | 3 | 0 | 3-(2-aminoethylamino)-propyltrimethoxysilane |
| 16 (com-parative) | n-propylene group | methyl group | — | $NHCONH_2$ | | — | 3 | 0 | 3-ureidopropyl-trimethoxysilane |

Preparation of Pigment Dispersion

Pigment dispersions were produced by the following procedure. The production conditions of the pigment dispersions are given in Table 4.

Pigment Dispersion 1 to 22, 27 to 29, 31 to 47 and 50

First, 40.00 parts of a titanium oxide particle of the type given in Table 4, a dispersant of the type and amount used (parts) given in Table 4 and ion-exchanged water used in an amount such that the total amount of components was 100.00 parts were mixed. Preliminary dispersion treatment was performed with a homogenizer. Thereafter, dispersion treatment (main dispersion treatment) was performed at 25° C. for 12 hours with a paint shaker using 0.5-mm zirconia beads. The zirconia beads were separated by filtration. An appropriate amount of ion-exchanged water was added as necessary to prepare each pigment dispersion having a titanium oxide particle content of 40.00%.

Pigment Dispersion 23 to 26 and 30

First, 40.00 parts of a titanium oxide particle of the type given in Table 4, a dispersant of the type and amount used (parts) given in Table 4 and ion-exchanged water used in an amount such that the total amount of components was 100.00 parts were mixed. Preliminary dispersion treatment was performed with a homogenizer. Thereafter, dispersion treatment (main dispersion treatment) was performed at 25° C. for 12 hours with a paint shaker using 0.5-mm zirconia beads. The zirconia beads were separated by filtration. An appropriate amount of ion-exchanged water was added as necessary to prepare each pigment dispersion. Each prepared pigment dispersion was dried by air blowing at 35° C. under stirring to remove water. Thereafter, a dehydration condensation reaction between the silanol group and the surface hydroxy group of the titanium oxide particle was promoted in an oven at 120° C. to obtain a titanium oxide particle powder in which part of the compound represented by general formula (1) was covalently bonded to the surface hydroxy group of the titanium oxide particle. The heating time in the oven at 120° C. was adjusted so as to satisfy the "Mass ratio (times) of covalently bonded compound" described in Tables 5 to 9. The titanium oxide particles powder was re-dispersed in an appropriate amount of ion-exchanged water to prepare each pigment dispersion having a titanium oxide particle content of 40.00%.

Pigment Dispersion 48

First, 40.00 parts of titanium oxide particle of the type given in Table 4 and 60.00 parts of deionized water were mixed and pre-dispersed using a homogenizer. Thereafter, a resin dispersant (trade name: "Floren G700", acid value: 60 mgKOH/g, available from Kyoeisha Chemical Co., Ltd.) was added thereto to give a mixture. This mixture was subjected to dispersion treatment for 12 hours using a paint shaker containing 0.5-mm zirconia beads to prepare pigment dispersion 48 having a titanium oxide particle content of 40.00%.

Pigment Dispersion 49

A pigment dispersion was prepared according to a method for preparing a pigment 3 k in Example 3 of PCT Japanese Translation Patent Publication No. 2017-521348. Specifically, a pigment dispersion was prepared in the same manner as pigment dispersion 1, except that titanium oxide particle 4 and compound 4 were used in place of titanium oxide particle 1 and compound 5. The resulting pigment dispersion was dried by air blowing at 35° C. under stirring to remove water, and then dried in an oven at 105° C. for 4 hours and 15 minutes to obtain a titanium oxide particle powder. The titanium oxide particle powder was re-dispersed in an appropriate amount of ion-exchanged water to prepare pigment dispersion 49 having a titanium oxide particle content of 40.0%.

Pigment Dispersion 51

A pigment dispersion was prepared in accordance with a method for preparing aqueous pigment dispersion A in Example 1 of Japanese Patent Laid-Open No. 2011-225867. Specifically, a pigment dispersion was prepared in the same manner as for pigment dispersion 1, except that 1.2 parts of vinyltriethoxysilane (silane coupling agent) was used in place of compound 5. The obtained pigment dispersion was heated to dryness to give a titanium oxide particle powder surface-treated with the silane coupling agent. Then 40.00 parts of the titanium oxide particle powder, 3.20 parts of a styrene-acrylic resin and 56.80 parts of ion-exchanged water were mixed. The styrene-acrylic resin was synthesized by a known method, styrene/acrylic acid/methacrylic acid=77/10/13 and the acid value was 150 mg/KOH. Thereafter, a dispersion treatment was performed again in the same procedure as for pigment dispersion 1 to prepare pigment dispersion 51 having a titanium oxide particle content of 40.00% and a resin content of 3.20%.

Calculation of Mass Ratio of Compound, Represented by General Formula (1), Covalently Bonded to Titanium Oxide Particle The mass ratio of the compound, represented by general formula (1), covalently bonded to the surface hydroxy group of the titanium oxide particle was measured as follows: First, each of the prepared pigment dispersions was subjected to centrifugal treatment using a centrifuge to sediment a solid content containing the titanium oxide particle. The supernatant liquid component was removed. Water was added to the solid content to re-disperse the solid content. The above-described series of operations was repeated three times to remove the compound, represented by general formula (1), not covalently bonded to the surface hydroxy group of the titanium oxide particle, thereby obtaining a titanium oxide particle to which the compound represented by general formula (1) was covalently bonded. The mass ratio was calculated by quantitatively analyzing the titanium oxide particle by thermogravimetric analysis (TGA). The resulting mass ratio was expressed as "Mass ratio of covalently bonded compound (times)" in Tables 5 to 9. The results of the same measurement on an ink containing each pigment dispersion revealed that the mass ratio was not changed. However, when a compound not satisfying general formula (1) was used as the dispersant, "0.000" was given in the column of "Mass ratio of covalently bonded compound (times)".

TABLE 4

| Production conditions of pigment dispersion | | | | | | | | | | | |
|---|---|---|---|---|---|---|---|---|---|---|---|
| | | Dispersant | | | | | | Dispersant | | | |
| Pigment dispersion | Titanium oxide particle | Compound | Amount used (parts) | Compound | Amount used (parts) | Pigment dispersion | Titanium oxide particle | Compound | Amount used (parts) | Compound | Amount used (parts) |
| 1 | 1 | 5 | 1.20 | | | 26 | 1 | 5 | 1.20 | | |
| 2 | 1 | 4 | 0.60 | 9 | 0.60 | 27 | 1 | 7 | 1.20 | | |
| 3 | 1 | 6 | 1.20 | | | 28 | 1 | 11 | 1.20 | | |
| 4 | 1 | 8 | 1.20 | | | 29 | 1 | 3 | 1.20 | | |
| 5 | 1 | 9 | 1.20 | | | 30 | 11 | 3 | 4.40 | | |
| 6 | 1 | 4 | 1.20 | | | 31 | 17 | 5 | 1.20 | | |
| 7 | 7 | 5 | 1.20 | | | 32 | 2 | 5 | 1.20 | | |
| 8 | 9 | 5 | 1.20 | | | 33 | 3 | 5 | 1.20 | | |
| 9 | 8 | 5 | 1.20 | | | 34 | 18 | 5 | 1.20 | | |
| 10 | 5 | 5 | 1.20 | | | 35 | 19 | 5 | 1.20 | | |
| 11 | 6 | 5 | 1.20 | | | 36 | 20 | 5 | 1.20 | | |
| 12 | 10 | 5 | 1.20 | | | 37 | 21 | 5 | 1.20 | | |
| 13 | 11 | 5 | 1.20 | | | 38 | 1 | 1 | 1.20 | | |
| 14 | 12 | 5 | 1.20 | | | 39 | 1 | 2 | 1.20 | | |
| 15 | 13 | 5 | 1.20 | | | 40 | 1 | 10 | 1.20 | | |
| 16 | 14 | 5 | 1.20 | | | 41 | 1 | 12 | 1.20 | | |
| 17 | 15 | 5 | 1.20 | | | 42 | 1 | 13 | 1.20 | | |
| 18 | 16 | 5 | 1.20 | | | 43 | 1 | 14 (comparative) | 1.20 | | |
| 19 | 1 | 5 | 0.056 | | | 44 | 1 | 15 (comparative) | 1.20 | | |
| 20 | 1 | 5 | 0.08 | | | 45 | 1 | 16 (comparative) | 1.20 | | |
| 21 | 1 | 5 | 4.00 | | | 46 | 1 | | | | |
| 22 | 1 | 5 | 4.40 | | | 47 | 22 | 5 | 1.20 | | |
| 23 | 1 | 5 | 1.20 | | | 48 | 1 | resin dispersant | 1.20 | | |
| 24 | 1 | 5 | 1.20 | | | 49 | 4 | 4 | 1.20 | | |
| 25 | 1 | 5 | 1.20 | | | 50 | 20 | 5 | 1.20 | | |

Preparation of Alumina Particle-Containing Liquid

The alumina particle-containing liquid was prepared with reference to a method for preparing ink 3 in Example 1 of International Publication No. 2018/190848. Specifically, an alumina particle dispersion containing an amphoteric alumina particle (trade name: "Dispal 23N4-80", dispersion particle diameter: 90 nm, available from Sasol) in an amount of 10% was provided. The pH of the alumina particle dispersion was adjusted to 4.0 with a strong acid (1 mol/L hydrochloric acid). The alumina particle dispersion was mixed using a propeller mixer until it became uniform, and pulverized with a bead mill to prepare a alumina particle-containing liquid (alumina particle content: 10%).

Preparation of Ink

Components of the types and amounts given in the upper rows of Tables 5 to 9 were mixed and stirred. Vinyblan 2685 (trade name) is a trade name of an acrylic emulsion (acrylic resin particle content: 30%) available from Nissin Chemical Industry Co., Ltd. Acetylenol E60 (trade name) is a nonionic surfactant available from Kawaken Fine Chemicals Co., Ltd. Ion-exchanged water containing potassium hydroxide was ion-exchanged water containing potassium hydroxide for adjusting the pH of each ink to the value given in Tables 5 to 9, and was added in such a manner that the total of the components was 100%. Thereafter, pressure filtration was performed with a membrane filter (available from Sartorius) having a pore size of 5.0 μm to prepare each ink. The pH of each ink was measured with a pH meter (trade name: "Portable pH Meter D-74", available from Horiba, Ltd).

Evaluation

Each ink obtained above was evaluated for the following items. In Examples of the present disclosure, in the evaluation criteria of an item described below, "A", "B", "C", "D" and "E" are defined as acceptable levels, and "F" is defined as an unacceptable level. The inks of Comparative examples 16 and 17 were not able to be ejected. The evaluation result sections of the ejection stability of these inks are expressed as "not ejectable". Although the inks of Example 17 and Example 18 were evaluated in the same manner, the ink of Example 17 was superior in terms of ejection stability. The evaluation results are given in the lower sections of Tables 5 to 9. In Tables 5 to 9, in the section of "Mass ratio of covalently bonded compound (times)", the amount of the compound, represented by general formula (1), covalently bonded to the surface of the titanium oxide particle, is expressed as a mass ratio based on the titanium oxide particle content.

Ejection Stability

Each of the inks obtained above was placed in a closed container and stored at 70° C. for 1 week. When the pH of the ink was higher than that before storage, potassium hydroxide was added to adjust the pH to be the same as that before storage. This operation is an acceleration condition assuming long-term storage and environmental changes such as a change in temperature. Thereafter, each ink was filled into an ink cartridge. The ink cartridge was set in an ink jet recording apparatus (trade name: "PIXUS PRO-10S", available from CANON KABUSHIKI KAISHA) equipped with a recording head that ejects the ink by thermal energy. The ink was continuously ejected at a frequency of 50,000 droplets/second from five freely selected ejection ports of the recording head. The ink droplets ejected were photographed in the lateral direction. The ejection speed of the ink droplets was calculated by image processing. The ejection speed of the ink droplets after predetermined periods of time (after 1 minute and 3 hours) from the start of the continuous ejection was calculated. The "change in ejection speed" was calculated for each ejection port based on the equation ("ejection speed of ink droplets after 1 minute"–"ejection speed of ink droplets after 3 hours")/("ejection speed of ink droplets after 1 minute"). The average "change in ejection speed" for each of the five ejection ports was determined, and the rate of change in ejection speed was calculated. The ejection stability of the ink was evaluated according to the evaluation criteria described below. A lower rate of change in ejection speed means better ink ejection stability. In contrast, for example, in a state in which an excessive amount of dispersant is adsorbed on the titanium oxide particle, energy for ejection is consumed for desorption of the excessively adsorbed dispersant at the time of ejection. This results in a decrease in ejection speed, thereby increasing the rate of change in ejection speed.

A: The rate of change in ejection speed was 0.02 or less.

B: The rate of change in ejection speed was more than 0.02 to 0.05 or less.

C: The rate of change in ejection speed was more than 0.05 to 0.08 or less.

D: The rate of change in ejection speed was more than 0.08 to 0.10 or less.

E: The rate of change in ejection speed was more than 0.10 to 0.20 or less.

F: The rate of change in ejection speed was more than 0.20.

TABLE 5

| Composition, properties and evaluation results of ink | | | | | | | | | | | | |
|---|---|---|---|---|---|---|---|---|---|---|---|---|
| | Example | | | | | | | | | | | |
| | 1 | 2 | 3 | 4 | 5 | 6 | 7 | 8 | 9 | 10 | 11 | 12 |
| Type of pigment dispersion | 1 | 2 | 1 | 1 | 3 | 4 | 5 | 6 | 7 | 8 | 9 | 10 |
| Pigment dispersion | 37.50 | 37.50 | 37.50 | 37.50 | 37.50 | 37.50 | 37.50 | 37.50 | 37.50 | 37.50 | 37.50 | 37.50 |
| Compound 4 | | | | | | | | | | | | |
| Alumina particle-containing liquid | | | | | | | | | | | | |
| Vinyblan 2685 | 20.00 | 20.00 | 20.00 | 20.00 | 20.00 | 20.00 | 20.00 | 20.00 | 20.00 | 20.00 | 20.00 | 20.00 |
| 1,2-Propanediol | 15.00 | 15.00 | 10.00 | 10.00 | 15.00 | 15.00 | 15.00 | 15.00 | 15.00 | 15.00 | 15.00 | 15.00 |
| 1,2-Butanediol | | | 5.00 | | | | | | | | | |
| 1,3-Propanediol | | | | 5.00 | | | | | | | | |
| 2-Pyrrolidone | 3.00 | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 | 0.90 |
| Ion-exchanged water containing potassium hydroxide | balance | balance | balance | balance | balance | balance | balance | balance | balance | balance | balance | balance |
| pH of ink | 8.2 | 8.0 | 8.1 | 8.1 | 8.2 | 8.1 | 8.2 | 8.0 | 7.7 | 8.2 | 7.8 | 8.1 |
| Titanium oxide particle content T (%) | 15.00 | 15.00 | 15.00 | 15.00 | 15.00 | 15.00 | 15.00 | 15.00 | 15.00 | 15.00 | 15.00 | 15.00 |
| Amount of compound represented by general formula (1) D (%) | 0.45 | 0.45 | 0.45 | 0.45 | 0.45 | 0.45 | 0.45 | 0.45 | 0.45 | 0.45 | 0.45 | 0.45 |
| Value of D/T (times) | 0.03 | 0.03 | 0.03 | 0.03 | 0.03 | 0.03 | 0.03 | 0.03 | 0.03 | 0.03 | 0.03 | 0.03 |
| Mass ratio of covalently bonded compound (times) | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 |
| Ejection stability | A | A | A | A | A | A | A | A | A | A | A | C |

TABLE 6

| Composition, properties and evaluation results of ink | | | | | | | | | | | | |
|---|---|---|---|---|---|---|---|---|---|---|---|---|
| | Example | | | | | | | | | | | |
| | 13 | 14 | 15 | 16 | 17 | 18 | 19 | 20 | 21 | 22 | 23 | 24 |
| Type of pigment dispersion | 11 | 12 | 13 | 14 | 15 | 16 | 17 | 18 | 19 | 20 | 21 | 22 |
| Pigment dispersion | 37.50 | 37.50 | 37.50 | 37.50 | 37.50 | 37.50 | 37.50 | 37.50 | 37.50 | 37.50 | 37.50 | 37.50 |
| Compound 4 | | | | | | | | | | | | |
| Alumina particle-containing liquid | | | | | | | | | | | | |
| Vinyblan 2685 | 20.00 | 20.00 | 20.00 | 20.00 | 20.00 | 20.00 | 20.00 | 20.00 | 20.00 | 20.00 | 20.00 | 20.00 |
| 1,2-Propanediol | 15.00 | 15.00 | 15.00 | 15.00 | 15.00 | 15.00 | 15.00 | 15.00 | 15.00 | 15.00 | 15.00 | 15.00 |
| 1,2-Butanediol | | | | | | | | | | | | |
| 1,3-Propanediol | | | | | | | | | | | | |
| 2-Pyrrolidone | 3.00 | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 | 0.90 |
| Ion-exchanged water containing potassium hydroxide | balance | balance | balance | balance | balance | balance | balance | balance | balance | balance | balance | balance |

TABLE 6-continued

| Composition, properties and evaluation results of ink | | | | | | | | | | | | |
|---|---|---|---|---|---|---|---|---|---|---|---|---|
| | Example | | | | | | | | | | | |
| | 13 | 14 | 15 | 16 | 17 | 18 | 19 | 20 | 21 | 22 | 23 | 24 |
| pH of ink | 8.1 | 8.1 | 8.1 | 8.1 | 7.9 | 7.9 | 7.4 | 7.6 | 8.1 | 8.2 | 8.2 | 8.2 |
| Titanium oxide particle content T (%) | 15.00 | 15.00 | 15.00 | 15.00 | 15.00 | 15.00 | 15.00 | 15.00 | 15.00 | 15.00 | 15.00 | 15.00 |
| Amount of compound represented by general formula (1) D (%) | 0.45 | 0.45 | 0.45 | 0.45 | 0.45 | 0.45 | 0.45 | 0.45 | 0.02 | 0.03 | 1.50 | 1.65 |
| Value of D/T (times) | 0.03 | 0.03 | 0.03 | 0.03 | 0.03 | 0.03 | 0.03 | 0.03 | 0.001 | 0.002 | 0.10 | 0.11 |
| Mass ratio of covalently bonded compound (times) | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 | less than 0.0001 |
| Ejection stability | A | A | C | C | C | D | E | E | E | A | A | E |

TABLE 7

| Composition, properties and evaluation results of ink | | | | | | | | | | | | |
|---|---|---|---|---|---|---|---|---|---|---|---|---|
| | Example | | | | | | | | | | | |
| | 25 | 26 | 27 | 28 | 29 | 30 | 31 | 32 | 33 | 34 | 35 | 36 |
| Type of pigment dispersion | 23 | 24 | 25 | 26 | 27 | 28 | 29 | 1 | 1 | 1 | 1 | 30 |
| Pigment dispersion | 37.50 | 37.50 | 37.50 | 37.50 | 37.50 | 37.50 | 37.50 | 37.50 | 37.50 | 37.50 | 37.50 | 37.50 |
| Compound 4 | | | | | | | | | | | | |
| Alumina particle-containing liquid | | | | | | | | | | | | |
| Vinyblan 2685 | 20.00 | 20.00 | 20.00 | 20.00 | 20.00 | 20.00 | 20.00 | 20.00 | 20.00 | 20.00 | 20.00 | 20.00 |
| 1,2-Propanediol | 15.00 | 15.00 | 15.00 | 15.00 | 15.00 | 15.00 | 15.00 | 15.00 | 15.00 | 15.00 | 15.00 | 15.00 |
| 1,2-Butanediol | | | | | | | | | | | | |
| 1,3-Propanediol | | | | | | | | | | | | |
| 2-Pyrrolidone | 3.00 | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 | 0.90 |
| Ion-exchanged water containing potassium hydroxide | bal-ance | bal-ance | bal-ance | bal-ance | bal-ance | bal-ance | bal-ance | bal-ance | bal-ance | bal-ance | bal-ance | bal-ance |
| pH of ink | 8.2 | 8.3 | 8.4 | 8.4 | 8.2 | 8.2 | 8.1 | 6.6 | 7.3 | 8.9 | 9.4 | 9.4 |
| Titanium oxide particle content T (%) | 15.00 | 15.00 | 15.00 | 15.00 | 15.00 | 15.00 | 15.00 | 15.00 | 15.00 | 15.00 | 15.00 | 15.00 |
| Amount of compound represented by general formula (1) D (%) | 0.45 | 0.45 | 0.45 | 0.45 | 0.45 | 0.45 | 0.45 | 0.45 | 0.45 | 0.45 | 0.45 | 1.65 |
| Value of D/T (times) | 0.03 | 0.03 | 0.03 | 0.03 | 0.03 | 0.03 | 0.03 | 0.03 | 0.03 | 0.03 | 0.03 | 0.11 |
| Mass ratio of covalently bonded compound (times) | 0.0004 | 0.002 | 0.004 | 0.008 | less than 0.0001 | less than 0.0001 | less than 0.0001 | less than 0.0001 | less than 0.0001 | less than 0.0001 | less than 0.0001 | 0.002 |
| Ejection stability | A | B | C | D | C | C | C | E | A | A | E | E |

TABLE 8

| Composition, properties and evaluation results of ink | | | | | | | | | | | |
|---|---|---|---|---|---|---|---|---|---|---|---|
| | Comparative example | | | | | | | | | | |
| | 1 | 2 | 3 | 4 | 5 | 6 | 7 | 8 | 9 | 10 | 11 |
| Type of pigment dispersion | 31 | 32 | 33 | 34 | 35 | 36 | 37 | 38 | 39 | 40 | 41 |
| Pigment dispersion | 37.50 | 37.50 | 37.50 | 37.50 | 37.50 | 37.50 | 37.50 | 37.50 | 37.50 | 37.50 | 37.50 |
| Compound 4 | | | | | | | | | | | |
| Alumina particle-containing liquid | | | | | | | | | | | |
| Vinyblan 2685 | 20.00 | 20.00 | 20.00 | 20.00 | 20.00 | 20.00 | 20.00 | 20.00 | 20.00 | 20.00 | 20.00 |
| 1,2-Propanediol | 15.00 | 15.00 | 15.00 | 15.00 | 15.00 | 15.00 | 15.00 | 15.00 | 15.00 | 15.00 | 15.00 |
| 1,2-Butanediol | | | | | | | | | | | |
| 1,3-Propanediol | | | | | | | | | | | |

TABLE 8-continued

| Composition, properties and evaluation results of ink | | | | | | | | | | | |
|---|---|---|---|---|---|---|---|---|---|---|---|
| | Comparative example | | | | | | | | | | |
| | 1 | 2 | 3 | 4 | 5 | 6 | 7 | 8 | 9 | 10 | 11 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 |
| Ion-exchanged water containing potassium hydroxide | bal-ance | bal-ance | bal-ance | bal-ance | bal-ance | bal-ance | bal-ance | bal-ance | bal-ance | bal-ance | bal-ance |
| pH of ink | 7.4 | 7.8 | 8.3 | 8.2 | 8.5 | 8.3 | 8.5 | 8.2 | 8.2 | 8.2 | 8.2 |
| Titanium oxide particle content T (%) | 15.00 | 15.00 | 15.00 | 15.00 | 15.00 | 15.00 | 15.00 | 15.00 | 15.00 | 15.00 | 15.00 |
| Amount of compound represented by general formula (1) D (%) | 0.45 | 0.45 | 0.45 | 0.45 | 0.45 | 0.45 | 0.45 | 0.00 | 0.00 | 0.00 | 0.00 |
| Value of D/T (times) | 0.03 | 0.03 | 0.03 | 0.03 | 0.03 | 0.03 | 0.03 | 0.00 | 0.00 | 0.00 | 0.00 |
| Mass ratio of covalently bonded compound (times) | less than 0.0001 | less than 0.0001 | less than 0.0001 | less than 0.0001 | less than 0.0001 | less than 0.0001 | less than 0.0001 | 0.000 | 0.000 | 0.000 | 0.000 |
| Ejection stability | F | F | F | F | F | F | F | F | F | F | F |

TABLE 9

| Composition, properties and evaluation results of ink | | | | | | | | | | | |
|---|---|---|---|---|---|---|---|---|---|---|---|
| | Comparative example | | | | | | | | | | |
| | 12 | 13 | 14 | 15 | 16 | 17 | 18 | 19 | 20 | 21 | 22 |
| Type of pigment dispersion | 42 | 43 | 44 | 45 | 46 | 47 | 48 | 48 | 49 | 50 | 51 |
| Pigment dispersion | 37.50 | 37.50 | 37.50 | 37.50 | 37.50 | 37.50 | 37.50 | 37.50 | 37.50 | 37.50 | 37.50 |
| Compound 4 | | | | | | | | 0.45 | | | |
| Alumina particle-containing liquid | | | | | | | | | | 1.55 | |
| Vinyblan 2685 | 20.00 | 20.00 | 20.00 | 20.00 | 20.00 | 20.00 | 20.00 | 20.00 | 20.00 | 20.00 | 20.00 |
| 1,2-Propanediol | 15.00 | 15.00 | 15.00 | 15.00 | 15.00 | 15.00 | 15.00 | 15.00 | 15.00 | 15.00 | 15.00 |
| 1,2-Butanediol | | | | | | | | | | | |
| 1,3-Propanediol | | | | | | | | | | | |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 |
| Ion-exchanged water containing potassium hydroxide | bal-ance | bal-ance | bal-ance | bal-ance | bal-ance | bal-ance | bal-ance | bal-ance | bal-ance | bal-ance | bal-ance |
| pH of ink | 8.2 | 8.2 | 8.6 | 8.5 | 8.6 | 7.9 | 8.4 | 8.4 | 7.9 | 7.9 | 7.9 |
| Titanium oxide particle content T (%) | 15.00 | 15.00 | 15.00 | 15.00 | 15.00 | 15.00 | 15.00 | 15.00 | 15.00 | 15.00 | 15.00 |
| Amount of compound represented by general formula (1) D (%) | 0.00 | 0.00 | 0.00 | 0.00 | 0.00 | 0.45 | 0.00 | 0.45 | 0.45 | 0.45 | 0.00 |
| Value of D/T (times) | 0.00 | 0.00 | 0.00 | 0.00 | 0.00 | 0.03 | 0.00 | 0.03 | 0.03 | 0.03 | 0.00 |
| Mass ratio of covalently bonded compound (times) | 0.000 | 0.000 | 0.000 | 0.000 | 0.000 | less than 0.0001 | 0.000 | less than 0.0001 | 0.030 | less than 0.0001 | 0.000 |
| Ejection stability | F | F | F | F | not ejectable | not ejectable | F | F | F | F | F |

According to an embodiment of the present disclosure, it is possible to provide a titanium oxide-containing aqueous ink that is used for ink jet recording and that has superior ejection stability, an ink cartridge containing the aqueous ink and an ink jet recording method. Moreover, according to an embodiment of the present disclosure, it is also possible to provide a method for producing a titanium oxide particle dispersion that can be used for the production of an aqueous ink for ink jet recording, the aqueous ink having superior ejection stability, and a method for producing an aqueous ink using the titanium oxide particle dispersion obtained by the production method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-165004 filed Oct. 6, 2021 and No. 2022-145602 filed Sep. 13, 2022, which are hereby incorporated by reference herein in their entirety.

What is claimed is:

1. An aqueous ink for ink jet recording, comprising:

a titanium oxide particle; and a dispersant for the titanium oxide particle, wherein the titanium oxide particle contains titanium oxide, at least part of a surface of the titanium oxide is covered with alumina and silica, a proportion of the alumina in the titanium oxide particle is 0.50 times or more to 1.00 time or less a proportion of the silica in the titanium oxide particle in terms of a mass ratio, a proportion of the titanium oxide in the titanium oxide particle is 90.0% by mass or more based on a total mass of the titanium oxide particle, and the dispersant for the titanium oxide particle comprises a compound represented by the following general formula (1):

(1)

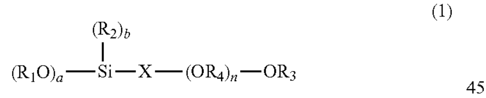

where in general formula (1), $R_1$, $R_2$ and $R_5$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

2. The aqueous ink according to claim 1, wherein a proportion of the titanium oxide in the titanium oxide particle is 98.5% by mass or less based on a total mass of the titanium oxide particle.

3. The aqueous ink according to claim 1, wherein a proportion of the alumina in the titanium oxide particle is 0.50% by mass or more to 4.00% by mass or less based on a total mass of the titanium oxide particle.

4. The aqueous ink according to claim 1, wherein a proportion of the silica in the titanium oxide particle is 1.00% by mass or more to 4.00% by mass or less based on a total mass of the titanium oxide particle.

5. The aqueous ink according to claim 1, wherein the titanium oxide particle has a 50% cumulative particle size of 200 nm or more to 400 nm or less on a volume basis.

6. The aqueous ink according to claim 1, wherein an amount of the titanium oxide particle contained in the aqueous ink is 1.00% by mass or more to 20.00% by mass or less based on a total mass of the ink.

7. The aqueous ink according to claim 1, wherein an amount of the compound, represented by general formula (1), contained in the aqueous ink is 0.002 times or more to 0.10 times or less an amount of the titanium oxide particle contained in the aqueous ink in terms of a mass ratio.

8. The aqueous ink according to claim 1, wherein an amount of the compound, represented by general formula (1), covalently bonded to a surface of the titanium oxide particle is 0.001 times or less an amount of the titanium oxide particle contained in the aqueous ink in terms of a mass ratio.

9. The aqueous ink according to claim 1, wherein the compound represented by general formula (1) comprises a compound represented by the following general formula (2):

(2)

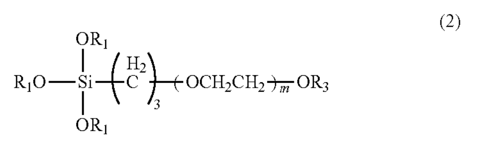

where in general formula (2), $R_1$ and $R_5$ are each independently a hydrogen atom or an alkyl group having 1 to 4 carbon atoms, and m is 8 to 24.

10. The aqueous ink according to claim 1, wherein an amount of the compound represented by general formula (1) is 0.01% by mass or more to 1.00% by mass or less based on a total mass of the ink.

11. The aqueous ink according to claim 1, wherein an amount of the compound represented by general formula (1) is 0.02% by mass or more to 0.50% by mass or less based on a total mass of the ink.

12. The aqueous ink according to claim 1, wherein the aqueous ink has a pH of 7.0 or more to 9.0 or less.

13. An ink cartridge comprising an ink; and an ink storage portion storing the ink, wherein the ink comprises the aqueous ink according to claim 1.

14. An ink jet recording method of recording an image onto a recording medium by ejecting an ink from an ink jet recording head, wherein the ink comprises the aqueous ink according to claim 1.

15. A titanium oxide particle dispersion used in a production of an aqueous ink for ink jet recording, comprising:

a titanium oxide particle; and a dispersant for the titanium oxide particle, wherein the titanium oxide particle contains titanium oxide, at least part of a surface of the titanium oxide is covered with alumina and silica, the dispersant for the titanium oxide particle comprises a compound represented by the following general formula (1), a proportion of the alumina in the titanium oxide particle is 0.50 times or more to 1.00 time or less a proportion of the silica in the titanium oxide particle in terms of a mass ratios, and a proportion of the titanium oxide in the titanium oxide particle is 90.0% by mass or more based on a total mass of the titanium oxide particle:

(1)

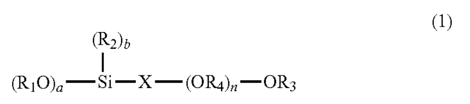

where in general formula (1), $R_1$, $R_2$ and $R_5$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

16. A method for producing a titanium oxide particle dispersion used in a production of an aqueous ink for ink jet recording, comprising:

providing a titanium oxide particle containing titanium oxide, at least part of a surface of the titanium oxide being covered with alumina and silica; and dispersing the titanium oxide particle in a liquid medium with a compound, represented by the following general formula (1), for dispersing the titanium oxide particle, wherein a proportion of the alumina in the titanium oxide particle is 0.50 times or more to 1.00 time or less a proportion of the silica in the titanium oxide particle in terms of a mass ratio, and a proportion of the titanium oxide in the titanium oxide particle is 90.0% by mass or more based on a total mass of the titanium oxide particle, (1)

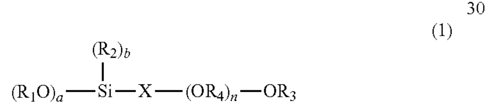

where in general formula (1), $R_1$, $R_2$ and $R_5$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

17. A method for producing an aqueous ink for ink jet recording, comprising:

mixing the titanium oxide particle dispersion produced by the method according to claim 16 and another ink component.

18. An aqueous ink for ink jet recording, comprising:

a titanium oxide particle; and a dispersant for the titanium oxide particle, wherein the titanium oxide particle contains titanium oxide, at least part of a surface of the titanium oxide is covered with alumina and silica, a proportion of an aluminum element in the titanium oxide particle is 0.57 times or more to 1.13 times or less a proportion of a silicon element in the titanium oxide particle in terms of a mass ratio, the proportions being obtained by inductively coupled plasma-optical emission spectrometry, a proportion of the titanium oxide in the titanium oxide particle is 90.0% by mass or more based on a total mass of the titanium oxide particle, and the dispersant for the titanium oxide particle comprises a compound represented by the following general formula (1):

(1)

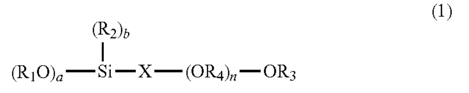

where in general formula (1), $R_1$, $R_2$ and $R_5$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

* * * * *